(12) United States Patent
Nilsson et al.

(10) Patent No.: US 11,192,243 B2
(45) Date of Patent: Dec. 7, 2021

(54) METHOD, CONSTRAINING DEVICE AND SYSTEM FOR DETERMINING GEOMETRIC PROPERTIES OF A MANIPULATOR

(71) Applicant: COGNIBOTICS AB, Lund (SE)

(72) Inventors: Klas Nilsson, Lund (SE); Adam Nilsson, Lund (SE); Andreas Stolt, Lund (SE); Olof Sornmo, Lund (SE); Martin Holmstrand, Lund (SE); Niklas Nilsson, Lund (SE)

(73) Assignee: COGNIBOTICS AB, Lund (SE)

( * ) Notice: Subject to any disclaimer, the term of this patent is extended or adjusted under 35 U.S.C. 154(b) by 679 days.

(21) Appl. No.: 16/089,282

(22) PCT Filed: Mar. 27, 2017

(86) PCT No.: PCT/EP2017/057187
§ 371 (c)(1),
(2) Date: Sep. 27, 2018

(87) PCT Pub. No.: WO2017/167687
PCT Pub. Date: Oct. 5, 2017

(65) Prior Publication Data
US 2020/0298403 A1    Sep. 24, 2020

(30) Foreign Application Priority Data

Mar. 29, 2016    (EP) .................................... 16162695

(51) Int. Cl.
*B25J 9/16*    (2006.01)
*B23Q 3/157*    (2006.01)
(Continued)

(52) U.S. Cl.
CPC ........ *B25J 9/1633* (2013.01); *B23Q 3/15713* (2013.01); *B25J 9/1671* (2013.01); *B25J 15/0019* (2013.01); *B25J 15/0433* (2013.01)

(58) Field of Classification Search
CPC .... B25J 9/1633; B25J 9/1671; B25J 15/0019; B25J 15/0433; B25J 9/1653; B25J 9/1692;
(Continued)

(56) References Cited

U.S. PATENT DOCUMENTS

2013/0079928 A1    3/2013    Soe-Knudsen et al.

FOREIGN PATENT DOCUMENTS

| CN | 103302663 A | 9/2013 |
| CN | 104736307 A | 6/2015 |

(Continued)

OTHER PUBLICATIONS

International Search Report on corresponding PCT application (PCT/EP2017/057187) from International Searching Authority (EPO) dated Nov. 8, 2017.
(Continued)

*Primary Examiner* — Bhavesh V Amin
(74) *Attorney, Agent, or Firm* — Klein, O'Neill & Singh, LLP

(57) ABSTRACT

A method and system for determining geometric properties of a manipulator (2). The manipulator (2) is controlled to perform constrained motions exhibiting force interaction with the environment, or between different links of the manipulator (2), such that a kinematic chain is formed mechanically. The chain may include peripherals and external axes of motion. A constraining device, enables motions that facilitate the determination of geometric properties. A unified model of joint and link compliances facilitates determination of stiffness parameters. The force interaction is controlled with awareness of friction such that non-geometric properties are possible to identify, thereby enabling separation of non-geometric effects from the geometric ones, which improves accuracy.

35 Claims, 10 Drawing Sheets

(51) Int. Cl.
    *B25J 15/00*    (2006.01)
    *B25J 15/04*    (2006.01)

(58) Field of Classification Search
    CPC ...... B23Q 3/15713; G05B 2219/39048; G05B 2219/39183; G05B 2219/39186; G05B 2219/40279; G05B 2219/40527; G05B 19/401
    See application file for complete search history.

(56) References Cited

FOREIGN PATENT DOCUMENTS

| DE | 10143753 | 4/2003 |
|---|---|---|
| EP | 2636492 A2 | 9/2013 |
| WO | 2006086021 A2 | 8/2006 |
| WO | WO2012076038 | 6/2012 |
| WO | WO2014065744 | 5/2014 |
| WO | WO2015030650 | 3/2015 |

OTHER PUBLICATIONS

Written Opinion on corresponding PCT application (PCT/EP2017/057187) from International Searching Authority (EPO) dated Nov. 8, 2017.

Bennett et al.; "Autonomous Calibration of Single-Loop Closed Kinematic Chains Formed by Manipulators with Passive Endpoint Constraints"; IEEE Transactions on Robotics and Automation; IEEE Inc; New York, US; vol. 7, No. 5; pp. 597-606; Oct. 1, 1991; XP000234416.

Ruderman; "Modeling of Elastic Robot Joints with Nonlinear Damping and Hysteresis"; Feb. 1, 2012; XP055107616.

Lehmann et al.; "Robot Joint Modeling and Parameter Identification Using the Clamping Method"; IFAC Proceedings; Vo;. 46(9); pp. 813-818; Jun. 19, 2013; XP002761378.

Bergstrom et al.; "Evaluation of Calibration Method for Redundant Dual Arm Industrial Robots Using Internal Sensors"; Lund University Department of Automatic Control; Dec. 2016; pp. 42-44 and 69-70; XP002774062.

Brand et al.; "Calibration of Robot Kinematics Using a Double Ball-Bar with Embedded Sensing"; Lund University Department of Automatic Control; Dec. 2016; pp. 3, 39-41, 52, 62; XP002774063.

Abele et al.; "Cartesian Compliance Model for Industrial Robots Using Virtual Joints"; Prod. Eng. Res. Devel. 2:339-343; Jul. 22, 2008; German Academic Society for Production Engineering (WGP) 2008.

Bennett et al.; "Kinematic Calibration by Direct Estimation of the Jacobian Matrix"; IEEE International Conference on Robotics and Automation; Nice, France; May 1992.

Driels; "Using Passive End-Point Motion Constraints to Calibrate Robot Manipulators"; Transactions of the ASME; vol. 115, pp. 560-566; Sep. 1993.

Khalil et al.; "Geometric Calibration of Robots with Flexible Joints and Links"; Journal of Intelligent and Robotic Systems; vol. 34, No. 4, pp. 357-379; Aug. 2002.

Moberg; "Modeling and Control of Flexible Manipulators"; Linkoping studies in science and technology; Dissertations; No. 1349; Department of Electrical Engineering; Linkoping University; Lindoping, Sweden; 2010.

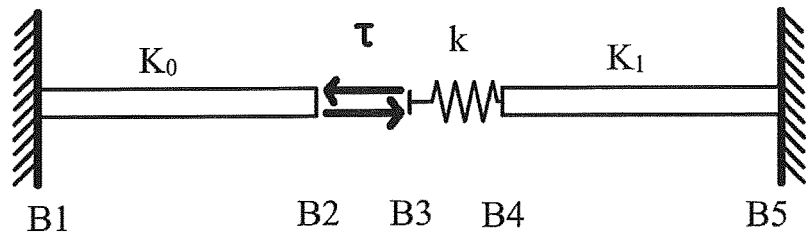
Fig. 9a
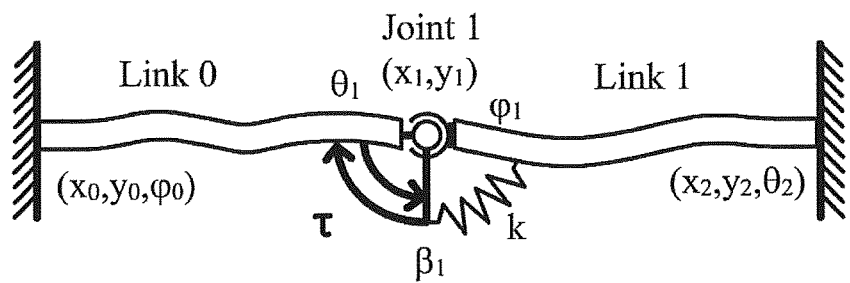
Fig. 9b
Fig. 9c

METHOD, CONSTRAINING DEVICE AND SYSTEM FOR DETERMINING GEOMETRIC PROPERTIES OF A MANIPULATOR

CROSS-REFERENCE TO RELATED APPLICATION

This application is the National Phase, under 35 U.S.C. §371(c), of International Application No. PCT/EP2017/057187, filed Mar. 27, 2017, which claims priority from EP 16162695.7, filed Mar. 29, 2016. The disclosures of all of the referenced applications are incorporated herein by reference in their entirety.

FEDERALLY SPONSORED RESEARCH OR DEVELOPMENT

Not Applicable

TECHNICAL FIELD

The present disclosure relates to the technical field of calibration of industrial robots. In particular, the disclosure is related to a method and a system for determining geometric properties of a manipulator comprising joints and links that may exhibit lumped and/or distributed elastic effects as well as non-linear effects such as friction and gearbox backlash, and a constraining device for use in such a system and method. The disclosure also includes computer products for determination and utilization of the geometric properties.

BACKGROUND

For automated tasks to be carried out in typical robot applications, such as for industrial robots in manufacturing, an end-effector need to be moved to different poses by means of a controller according to programmed instructions. The end-effector is often and hereafter referred to as the tool. A pose comprises a position and an orientation. The desired or programmed tool pose, as well as the actual physical one, can be in free space or in contact with some workpiece, the latter case implying a need for accuracy despite interaction forces. Programmed poses can be defined to be reached individually or as part of a path, the latter case implying accuracy needs for the controlled motion between the poses too.

The tool pose relates, in a well-defined way according to existing tool-calibration procedures, to the pose of the last link of the robot, and hence we can for simplicity limit the following to end-flange for attaching the tool to the robot, or equivalently to a tool-exchanging flange in case of a tool-exchanger being used to permit programmed change of tools, which in both case hereafter is referred to as the robot pose.

The robot pose is mechanically accomplished by a set of interconnected joints and links, forming a manipulator, typically arranged in an arm-like manner with each joint moving the attached link ending with the next joint, etc. A mechanical joint motion typically includes a joint transmission driven by the joint motor, which is controlled by the controller, which in turn might control more than one manipulator as for dual-arm robots.

From a control system point of view, a robot pose can be an actual control pose that can be based on measured motor angles or a pose can represent transformed servo control setpoints. In both cases the pose deviates from the actual (and normally unknown) physical pose for reasons explained throughout this document. The servo control, the generation of trajectories to it, coordinate transformations according to kinematic models, and interpretation of user commands/instructions is normally not possible to reprogram by the user of the system, and is hence referred to as the system level of the manipulator controller. That is opposed to the user level of the control system, where user programs and manual commands effecting motions (and related computations) are entered and effectuated. A by the user intended/programmed robot pose is represented by a so called target pose in the robot program. Equivalently, manual commands as well as remote control of the robot are simply means of providing such target poses for the robot system.

To let the robot programmer (or programming software) specify motions along straight lines (and other geometries in the operational space of the robot), to enable a proper path following for motions between poses along a path, to enable computed (e.g. obtained from CAD data) programmed poses, and to enable easy updating of poses when the workpiece is relocated, the controller contains a kinematic model of the robot. The kinematic model includes parameters for the joints and the links and their geometric relations of the manipulator. In most controllers the kinematic model is a simple one based on the assumption that the joints and links are ideally rigid with known dimensions for that type of manipulator. It is highly desirable that the resulting physical robot pose, within certain tolerances depending on the application, corresponds well to the programmed robot pose.

When demands on accuracy are high, that correspondence is problematic for industrial robots today, resulting in deviations that vary for each robot individual. To account for the actual geometry of each robot individual, so called kinematic calibration is used to determine and update the kinematic parameters. Robots from major industrial brands therefore have an absolute-accuracy option, hereafter referred to as AbsAcc, which implements the kinematic calibration, including the use of the determined parameters within the control for that type of robot. The actual calibration is for complexity reasons mainly carried out by the robot manufacturer, typically before the robot is delivered.

Since manipulators are not quite rigid, as usually assumed in kinematics, there will also be deviations due to mass and process forces resulting in a deviation at the location of the end-effector. Managing deviations by the user via adjustments of the user program (so called touch-up that is a manual adjustment of the deviating programmed poses) limits the reuse of robot tasks and increases the cost for robot programming and commissioning.

The resulting end-effector accuracy using AbsAcc for typical industrial manipulators, for instance with payloads between 3 and 300 kg, is in the range of a third to over one millimeter. While the accuracy for a calibrated mid-size manipulator can be 0.5 mm, instead of 2-3 mm without calibration, there is still a major demand for more accurate robots in many applications such as plasma welding, laser cutting, and precision assembly. In those applications, a reduction of the inaccuracies to a fifth would be of large benefit. That would for typical high-end mid-size robots mean an accuracy of 0.1 mm.

Considering that the repeatability for a robot typically is well below the 0.1 mm, sometimes even down to 0.01 mm, and the repeatability is the theoretical and practical limit of accuracy, the mentioned improvement with reduction of inaccuracies to a fifth could be possible. There is thus a need to deal with the remaining errors in order to obtain as little deviation as possible from the programmed pose. However, that has so far only been possible with costly and complex solutions that are less applicable such as:

Feedback from external sensor systems, such as laser trackers, means compensation of whatever error sources there are, but at a high cost and with limited bandwidth.

More accurate mechanics, which is costly and/or with limited performance by increased weight.

Arm-side sensing of the joint angles and/or torques, which is costly and cannot be added as an option when needed, and deviations due to link bending is not managed.

Due to the problems mentioned, none of these alternatives received any wider industrial acceptance.

To account for effects of non-rigid joints and links, existing AbsAcc systems typically include models of joint compliance to take gravity forces into account. Some advanced systems also includes a model of link compliance, represented via joint compliance orthogonal to the direction of motion, which is useful for taking into account lack of stiffness in bearings and bearing housings at the end of the links. Despite controller compensation based on those models and parameters, deviations remain since:

1. The stiffness is assumed to be linear, while most transmission exhibit non-linear properties, and hence the non-linear effects are averaged (not taken care of explicitly) such that the linear model often does not explain the deviation.
2. Friction affects joint motions in complex ways depending on transmissions and on the machine elements, with variations depending on time, load, wear, temperature, atc. However, only simple constant friction properties, if any, are used within the control.
3. The stiffness is fixed after the use of existing calibration methods. That is, the stiffness is not calibrated for each manipulator (for different temperatures, wear, etc.), since determining such parameters have been lacking an industrially applicable solution.
4. The models are not general enough to fully explain deviations due to link compliance, which is an effect of compliance (as well as the mass) being distributed over the link geometry. Generally, these deviations are 5DOF per link in addition to the joint DOF.
5. Existing AbsAcc industrial products are developed to provide accuracy for free-space motions with a known payload, and hence do not depend on feedback from online/internal motor signals. Unknown payloads and process forces are neglected.

Fundamentally, any type of kinematic calibration is based on the formation of at least one kinematic chain, either mechanically or by other physical means such as optics as of the laser of the welding process. For calibration in general, a corresponding kinematic chain is formed via some peripheral for calibration such as a laser tracker measuring the actual end-effector pose for different programmed motions. The kinematic parameters are then obtained by optimizing a model to fit the measurements with minimum residual error. The before mentioned errors due to non-geometric effects such as compliance and backlash can then be 'averaged out' by an excess of data captured from a variety of motions. One example of such averaging can be found in Driels, M. R. "Using passive end-point motion constraints to calibrate robot manipulators." Journal of dynamic systems, measurement, and control (1993), where despite awareness of the effect as such, and despite general availability of models of the physical effects, the knowledge about the source of deviation is not taken into account, with reduced absolute accuracy as a result.

Attempts have been made to develop a model of link and joint compliance using a quasi-static and dynamic model of a manipulator, such as described in "Modeling and control of flexible manipulators" by Moberg S. published in 2010. The publication characterizes compliant joints as a spring-mass system with four links Link 1-Link 4, three motors M1-M3 and different masses and spring constants as illustrated in FIG. 2 in the publication. Link elasticity is then modeled by means of a stiffness matrix. However, as Moberg readily admits, modeling the number of non-actuated joints and their locations is not obvious.

Several types of solutions exist which deal with some types of deviations mentioned earlier, where optical systems for pose measurements and tracking are the most common. Such systems, referred to as external calibration systems, can be used for online compensation of the end-effector motions without parameters for the sources of deviations, or they can be used to calibrate the parameters of the kinematic model. Although a calibration system of today does not capture parameters describing deflections due to force, high-end robots in common application are rather stiff. While applicable to large scale production facilities with a large number of robots, the cost of the mentioned external calibration system often exceeds the cost of a single robot. In smaller scale production facilities relying on the operation of one or a few robots, such external calibration systems are not applicable due to prohibitive cost. One example of an external calibration system is described in WO2012/076038.

A slightly modified version of a calibration system is presented in the article "Kinematic Calibration by Direct estimation of the Jacobian Matrix" by Bennet, Hollerbach and Henri presented at ICRA, 1992, in Nice, France. In the article parameters in a Jacobian matrix of a robot are estimated by first clamping the robot in a predefined pose and then actuating the joints of the robot. Based on information from an external force/torque sensor attached to the end-link close to the point of clamping, the unknown kinematic parameters can then be determined. The Jacobian matrix expresses the dependency between endpoint velocities and joint velocities, or correspondingly for the forces/torques. Data obtained from a set of such actuations result in a set of such matrices, which are used to calculate the kinematic parameters. Even with kinematic calibration being performed, also with the force/torque based method neglecting the actuator-to-joint dynamics, deviations due to dynamic forces and force interactions with the workpiece remain.

The article "Cartesian compliance model for industrial robots using virtual joints" by E. Abele et al, Prod. Eng. Res. Devel. (258) describes modeling of a robot structure and identification of its parameters, where it is assumed that the overall elasticity is mainly attributed to the elasticity of the gears. The robot links and the connection from joint to link are considered inflexible. However, to be able to measure the joint compliance, only one joint at a time is loaded, and while measuring axis (i), all axes from the base link 10 to axis (i-l) have to be clamped giving a rather time consuming process of determining any compliance of the robot.

The overall problem and related approaches are described by Khalil in "Geometric Calibration of Robots with Flexible Joints and Links" (Journal of Intelligent and Robotic Systems, issue 34, pp. 357-379, 2002), but without providing a generic solution for the case of a mechanically closed kinematic chain that also may include hyperstatic load cases, as can be the case for singular configurations or when a robot with DOF less than six is clamped to the environment. Moreover, the joint torques are not actively used to obtain a more accurate calibration procedure, and as expected the accuracy reported in the article is deficient.

Yet another approach to obtaining geometric properties is to physically minimize the effects of the non-geometric effects, such that the mechanical kinematic chain as such exhibit properties close to ideal rigid-body kinematics. This is the situation implicitly assumed in US20130079928, which is suitable for the special case of comparably stiff light-weight manipulators (no gravity-based link bending) with low friction (no heavy-duty bearing-sealings and no preloaded compact gearboxes) and with transmissions that exhibit smooth compliance properties (no pure backlash but reduced stiffness around low torque, as for Harmonic Drive gears). However, for manipulators exhibiting more general non-geometric properties, a method overcoming those assumptions is needed.

Hence, for the purpose of reducing deviations by compensation based on calibrated models including compliance, the limitations of existing technology implies a need for a more accurate, simple and inexpensive way of determining the geometry of manipulators.

SUMMARY

Industrial robots themselves have arrangements and/or capabilities that would be desirable to utilize in order to avoid the limitations of the current state of the art:
  Modern robot control systems are from an algorithmic and computational point of view capable of advanced model-based control, assuming utilization of valid parameters for the involved models.
  The built-in sensors and control signals of typical robot servos are quite accurate; often with accuracy ten times that of the programmable resolution of coordinates, or ten times the absolute accuracy of a calibrated robot.
  The repeatability of the programmed motions is typically over ten times better than the absolute accuracy of the manipulator.
  The fact that industrial robot systems already utilizes some parameters that represents the effect of lack of stiffness, means that the kinematic calibration as such can be made significantly more accurate since calibration is model-based optimization from measurement data. Thus, there is a need for:
  More complete models that given proper parameters would explain the remaining deviations.
  An industrially applicable way of obtaining and maintaining the model parameters, preferably using only manipulator-internal sensors.
  Methods for correcting nominal robot motions based on the accuracy models, and for predicting the actual accuracy or lack of accuracy due to physical/control limits.

Despite decades of research, these needs and the mentioned accuracy demands have not been possible to fulfill, leaving the industrial calibration and accuracy problem unsolved. Manipulator accuracy is needed when the end-effector operates on or touches work objects, such as two metallic workpieces that should be joined by laser-welding, which means there is a kinematic chain comprising the manipulator and some application devices.

An implication from the above is that an industrially applicable and accurate calibration method using the existing internal sensors would be highly desirable. Both geometric and non-geometric properties then need to be identified.

To accomplish ultimate accuracy close to the repeatability, the fundamental approach here is to explicitly determine the involved disturbing properties of the joint and links, and then to account for those by means of model-based computations and to reduce the residuals by means of active control of motor torques. To express the influence of the additional models on the kinematics, more degrees of freedom are needed than used in current practices.

The number of independent parameters that determine a positional state of a rigid body, e.g. a stiff link, or of a mechanism is referred to as the Degree Of Freedom (DOF, also used in plural for Degrees Of Freedom). A free rigid body in 3-dimensional (Euclidean) space has 6 DOF, three translational and three rotational. A rigid or stiff link comprises such a rigid body. Each kinematic pair of links is connected via a joint that is usually sliding (the joint may then also be called prismatic, linear, or translational joint) or jointed (the joint may then also be called revolute or rotational joint). One such joint constrains five out of the six possible DOF of one link relative to the other one in the pair of links, which in a non-singular configuration of the manipulator adds one DOF to the final link (ending with a tool-mounting end-flange) of the manipulator. By means of its kinematic structure of links and joints, the DOF of the manipulator (manipulator-DOF) can be considered as being the minimum number of coordinates required to specify a kinematic configuration.

Since a tool, referred to as an end-effector of the robot, or equivalently a tool exchanger permitting changes of end-effector without manual assistance, is another physical body to be moved in Euclidean space. 6 DOF manipulators are most common since they comprise the minimum for full movability of the end-effector, which for a normal non-singular configuration requires 6 of the above mentioned joints. Other types of joints such as spherical and cylindrical joints also exist, but these can be seen as combinations of the above mentioned more simple joints, which are the ones referred to as joints in the following. This corresponds to the established notion of generalized joint coordinates in the robotics literature.

Compliance in terms of elastic and non-linear effects limits the accuracy of kinematic calibration, since those effects are not explicitly managed, which in turn would require models and related parameters to be known. Here, it is assumed that kinematics deals with elastic effects (in contrast to current practices with controllers that only cope with rigid-body kinematics). The notion of geometric properties then refers to the corresponding rigid-body properties that can be seen as the properties describing the unloaded elastic manipulator. The approach then is to make use of two complementary ways of determining the non-geometric properties:

1. Deviations around the manipulator joints, due to the properties of the joint transmissions, have been well known for long. Recently, see WO2014065744, it was discovered how the properties can be obtained without using external sensing, even automatically by the robot itself by clamping the end-effector to the environment.
2. Other deviations due to link compliances or non-liner effects such as backlash in bearings, also orthogonal to each respective joint motion, have been modeled such that calibration based on force interaction is possible. Furthermore, see WO2015030650, the parameters of those models are also possible to determine by the clamping technique mentioned in item 1.

Part of the approach here is to combine these two methods and the theories therein, but several obstacles remain:

Although item 1 above enables computation of the joint angles in most cases, there are backlash situations when the method does not result in sufficient accuracy for poses as needed in the kinematic calibration.

Kinematic calibration deals with the geometry of rigid bodies, but item 2 works with more realistic non-rigid models. Existing methods cope with some of these effects, but only with simplified elastic elements that are identified by external measurement systems and with forces coming from gravity effects on a mechanically open kinematic chain and/or from external actuation while ignoring motor torques.

The clamping according to items 1 and 2 typically constrain all end-effector degrees of freedom at unknown locations, which makes the clamped configurations unsuitable for kinematics since some kind of motions that exhibits geometric information are required for at least some of the kinematic parameters to be detectable in practice. With unconstrained free space motion, on the other hand, there are limited means to put the manipulator in favorable load conditions. An intermediate alternative would be to cope with the joint and link effects according to items 1 and 2 above while also permitting some mechanically constrained free space motion, which could be either in free subspace or with relative motions over some fixed distances. However, extensive and accurate models would be required, and the presence of friction (before, within and after each joint transmission) and other varying or non-linear properties has prevented progress towards theoretically possible accuracy.

In view of the above, it is an objective of the present disclosure to solve at least some of the drawbacks with the mentioned existing technology. It is a further object of the disclosure to provide an industrially applicable and accurate method using the existing internal sensors for determining the geometric properties of a manipulator.

These objectivs and others are at least partly achieved by a method and a system according to the independent claims, and by the embodiments according to the dependent claims.

According to a first aspect, the disclosure relates to a method for determining at least one geometric property of a manipulator that influences end-effector motions of the manipulator. The manipulator is arranged to be controlled by a control system for moving an end-effector of the manipulator to target poses. The manipulator further comprises at least two axes whereof at least one axis comprises at least one elasticity. The method comprises constraining motion of the manipulator by means of a constraining device such that the motion of the manipulator is physically constrained in at least one degree of freedom, and thereby enable a constrained manipulator motion and correspondingly a constrained motor motion for the at least one axis. The method further comprises commanding the manipulator to approach a set of target poses where for each target pose a physical pose is reached in which the constrained manipulator motion can be performed, which includes a non-zero constrained motor motion. The method further comprises performing friction-aware control of the constrained manipulator motion for a period of time while monitoring quantities related to motor torque and to motor angle of the at least one axis. The method further compises performing an identification of a set of kinematic parameters for an elasto-kinematic model that includes at least one known quantity representing the at least one elasticity, the identification being based on the monitored quantities and on elastic properties of the manipulator; and determining the at least one geometric property of the manipulator based on the identified set of kinematic parameters of the kinematic model.

The method provides a tractable way to determine the geometric properties of kinematic chains such as those of industrial robots, with improved accuracy than in prior art resulting from explicitly managing the non-geometric properties, using sensors embedded in the kinematic chain. The sensors used may be sensors only embedded in the kinematic chain.

According to some embodiments, the constraining motion of the manipulator comprises connecting a link of the manipulator to the constraining device. The link may be referred to as an end effector, i.e. then end of the manipulator, that is then directly connected via the end flange to the constraining device. The link may alternatively be connected to the constraining device via a tool exchanger or via some other clamping device added for this purpose. Thereby the method does not require a tool exchanger to be used within the application, and it is not limited to attaching a constraining device to the end flange of the manipulator. Instead, other points on the end-effector or manipulator links can be used. Moreover, by combining connections of a constraining device to different links, and relating the results of the method, both verification of geometric properties and determination of malfunctioning machine elements can be accomplished.

According to some embodiments, the set of target poses comprises a plurality of different orientations and positions of the end effector. By using multiple poses, each pose is subject to constraint that are known relative to each other per the constraining device, and utilizing motor signals (optionally in combination with external sensors), a set of equations can be formed such that all or a selected subset of geometric properties can be obtained.

According to some embodiments, the at least one axis comprises at least one friction effect. Since friction properties are not geometric it is not the subject of the present invention to determine those parameters. However, friction effects are problematic (accuracy, residuals, and convergence of the identification) when determining the geometric effects, and hence it is valuable to both integrate known techniques for determining the friction properties and to separate those effects from the identification of the geometric properties, thereby improving both the accuracy of the geometric parameters and of the compensated manipulator motion.

According to some embodiments, the method comprises performing friction-aware control by controlling the at least one axis in a reciprocal motion encompassing backlash of the at least one axis. As for friction, backlash and lost motion are problematic as such, and in particular in combination with friction related to different machine elements along the joint transmissions. The friction-aware control including the reciprocal motion avoids these problems by controlling each joint to obtain a predictable friction effect.

According to some embodiments, the method comprises commanding the manipulator to approach the set of target poses where for each target pose a physical pose is reached in which the constrained manipulator motion can be performed, due to the existence of at least one unconstrained direction of the constrained manipulator motion, and performing friction-aware control by controlling the at least one axis such that fully developed friction is accomplished. Thereby, the friction effect is such that friction is known and can be compensated for, hence not harming identification of the geometric properties. In general terms, the purpose of the friction-aware control is to accomplish well-defined friction forces/torques that can be separated from the effects that are explicitly managed.

According to some embodiments, the method comprises commanding the manipulator to approach the set of target poses where for each target pose a physical pose is reached, in which the constrained manipulator motion can be performed due to the at least one elasticity effecting the at least one axis, and performing friction-aware control by controlling the at least one axis in a reciprocal motion encompassing a mid-point corresponding to the middle of any (possibly non-zero) backlash while disregarding friction effects. This disregarding of friction effects means that although the friction force is not zero, the effect on the geometric identification is practically the same as if the friction was non-existing (zero), which is accomplished by positioning the motor to standstill in a position that results in the mid-point position as of the joint.

According to some embodiments, the method comprises commanding the manipulator to approach the set of target poses where for each target pose a physical pose is reached, in which the constrained manipulator motion can be performed due to the at least one elasticity effecting the at least one axis, and performing friction-aware control by controlling the at least one axis in a reciprocal motion encompassing a gravity-load-point and such that the at least one axis reaches the gravity-load-point. Again, the purpose is to accomplish well-defined friction forces/torques, but for this embodiment the benefit is that the load on the constraining device can be reduced, practically close to zero forces if all of the manipulator gravity forces are balanced out from the motor side.

According to some embodiments, the method comprises performing one or several steps of the method automatically by means of the control system. Opposed to earlier existing geometric calibration methods that requires an expert to actively perform the calibration, this means that the robot can perform the calibration by itself, at times when suitable for the application at hand and managed by the user program such that performing the disclosed method is understable/manageable within the production.

According to some embodiments, the manipulator motion refers to motion of an end-effector mounted via a tool-exchanger onto an end-flange of the manipulator and wherein end-effector properties are previously known, wherein the constraining motion of the manipulator comprises docking the manipulator to the constraining device that provides the mechanical interface as of the tool exchanger. The method may comprise detaching the end-effector (by means of the tool exchanger and for instance putting the end-effector aside in a so called tool stand), and thereafter constraining motion of the manipulator by docking the manipulator by means of the tool exchanger to the constraining device that provides the mechanical interface as of the tool exchanger. One part of the tool exchanger may then be part of the constraining device. Thereby no addition or modification of the manipulator or its end-effectors is required. The motion of the end-effector is thus defined by the motion of the end-flange. In some embodiments, the end effector referes to the last link or end of the manipulator. The last link or end or the manipulator is a part of the manipulator that may interact with the environment. Also here, the motion of the end-effector is defined by the motion of the end-flange.

According to some embodiments, the at least one geometric property is related to a peripheral device of the manipulator, the peripheral device comprising at least one link that is influenced by the motion of the manipulator. Present AbsAcc options deals with the manipulator itself, with calibration done within the manufacturing of the robot or by a service expert using portable equipment. Calibration of peripherals and so called external axes are, however, out of scope for support from the robot provider. Here, the disclosed method supports inclusion of peripheral devices in a coherent manner.

According to some embodiments, the elastic properties of the constraining device are known. Thereby, a defined a force/torque-dependent geometry is achieved that is manageable according to the ordinary steps of the method. Known properties, being it elastic or geometric, for the manipulator or for the peripherals, can be set to fixed known values. Unknown of the peripherls can be included as for the manipulator according to the previous embodiment. There are, however, also another option for passive peripherals and for a (non-actuated, e.g., passive) constraining device: By utilizing forces computed from motor torques the geometric effect of the passive elasticily can be compensated for without involving the stiffness calibration, which reduces the size of the optimization problem that determines the geometric properties: This can avoid sub-optima, or equivalently, reduce the number of required clamping poses despite external elastic effects.

According to some embodiments, wherein constraining motion of the manipulator comprises clamping the manipulator to at least one clamping point, where the position and/or orientation of the at least one clamping point may be unknown. Then the location of the clamping point forms some (up to 6) additional unknown geometric parameters, which can be determined by the disclosed method. This is useful for permitting an arbitrary placement of the ball-bar variant of the constraining device.

According to some embodiments, wherein constraining motion of the manipulator comprises clamping the manipulator to a plurality of different clamping points, where the positions and orientations of the clamping points may be unknown but the relative transformations between the clamping points are known. The known relative poses between the clamping points, for instance locally on a transportable unit such as a pallet held to the floor by its weight, can then be used although the location of that pallet is unknown as for the constraining device of the previous embodiment.

According to some embodiments, wherein constraning motion of the manipulator comprises offsetting a tool exchanger arranged to the manipulator such that the rotation axis of the tool exchanger is non-parallell with the rotation axis of the link of the manipulator that the tool exchanger is attached to. In other words, the front face of the tool exchanger coupling surface is not parallel with the front face of the end flange of the manipulator. In the practically common case that they are parallel, the geometric property motor offset of the final axis (typically the sixth) cannot be determined, but by clamping to a constraining device that provides an angular offset and then clamping that device to a fixed point in workspace, the non-parallel rotation axes are accomplished (and the final motor offset can be determined, e.g., after a robot wrist repair). This may be achieved by arranging an angular offset item that provides an angular offset between the end flange of the manipulator (or any other link of the manipulator) and the tool exchanger. If the tool exchanger that is used as part of the application is already non-parallel with the end-flange, which is an arrangement that can increase manipulability and reach but is less used today due to limited accuracy of reorientations (now solved with the present invention), both the final motor offset is possible to identify directly and more equation for the overall optimization problem is obtained.

According to some embodiments, at least one parameter of the position or orientation of the at least one clamping point is unknown. With insight concerning the previous three embodiments, the workspace of the robot may be arranged such that some dimensions are known and directly corresponding to some geometric properties, while other parameters are unknown and subject to identification, and the known and the unknowns may be part of the same clamping point. For instance, as common in industries with short series production where robtos are frequently relocated, a clamping point may be put on top of an I-beam of steel, which although extending to the base plate of the robot in a rigid manner implies a torsion around the beam. (It is well known in solid-state mechanics that so called open profiles such as I or U beams have low torsional stiffness, but this is often not known among robot programmers/installers.) The torsional stiffness can then be included as two rotational unknown stiffness parameters to be identified and thereby the geometry parameters, while the same clamping point can have the other four geometry parameters as known (either relative to each other or absolutely relative to the robot in case of recalibration after repair).

According to some embodiments, one elasticity is a property of at least one link. While determining link stiffness parameters without external sensor systems is made possible based on WO2015030650, that method and system assumes the clamping points are only approximately known with an accuracy limited by the accuracy of the geometric properties of the robot, which is sufficient in well-defined load cases. As an enhancement, this embodiment incorporated the elastic and geometric models into a coherent solution that uses the same set of clamping point for the non-geometric (such as link elasiticity) and the geometric properties.

According to some embodiments, the method comprises utilizing motor torques to determine at least one isostatic force that acts on at least one link of the constrained axes. To separate non-geometric parameters from the geometric ones, for better identification of the latter, forces/torques along the mechanical structure of the manipulator needs to be computed and managed in terms of their physical effects. For a manipulator with six DOFs or more that is not in a singular configuration this is most straingtforward with the disclosed method, and such a non-signular configuration is preferable since the properties of the different axes are better separated. Although a manipulator clamped (in this non-signular configuration) may appear (to mechanical engineers as experienced) as a being in put in a hyperstatic load case, the (friction-aware) control actually implies an isostatic load case. Both friction-aware control and dynamic selection of contributing joints may be used to improve accuracy.

According to some embodiments, the at least one link of the axes is hyperstatically loaded. Although isostatic loads are preferable, it may be the case that a hyperstatic load case is most proactical from an application point of view. Examples may be a 4 DOF robot (as common in palletizing and in pick-and-place application) without a 2 DOF constraining device (for simplicity), manipulators that operate in singular configuration (such as a 6 DOF robot with a milling tool aligned with joint 6 to make it a CNC-compatible 5 DOF machine) also during calibration, or special machines with passive lockable DOFs. The disclosed method works also in this case due to the fundamental approach to managing elastic effects.

According to some embodiments, the constraining device comprises a ball-bar mechanism. The length of the bar can then be configured such that a sufficient part of the work space is reached for all geometric parameters to be identified accurately. The ball joints, one at each end of the bar, can be built such that also the wrist can reorient sufficiently for all wrist parameters to be accurately identified. While the ball-joints are passive, they may include sensing to avoid modelling inaccuracies to deteriorate the accuracy of the identified parameters. Biased on insight related to the load of a low-friction ball-bar implementation being strictly along the direction of the bar, one may use the ball-bar mechanism also for obtaining the stiffness parameters, but this is for brevity omitted here.

According to some embodiments, the method comprises iterating steps A2 to A4, with the set of target poses in A2 being the same or being changed for each iteration, until load on the at least two axes is adjusted such that it results in a residual of the identification that is lower than a predetermined level corresponding to a certain robot accuracy.

According to a second aspect, the disclosure relates to use of the at least one geometric property determined according to any of the steps of the method as discloses herein, for updating nominal kinematic parameters of a manipulator.

According to a third aspect, the disclosure relates to use of the at least one geometric property determined according to any of the steps of the method as disclosed herein, for updating a robot program or motion control parameters of the manipulator.

According to a fourth aspect, the disclosure relates to a computer program comprising instructions which, when the program is executed by a control system, cause the control system to carry out the method according to any of the steps of the method as disclosed herein.

According to a fifth aspect, the disclosure relates to a computer-readable medium comprising instructions which, when executed by a control system, cause the control system to carry out the method according to any of the steps of the method as disclosed herein.

According to a sixth aspect, the disclosure relates to a system for determining at least one geometric property of the manipulator that influences motions of the manipulator. The manipulator is arranged to be controlled by a control system for moving the end-effector of the manipulator to target poses. The manipulator comprises at least two axes whereof at least one axis comprises at least one elasticity. The manipulator is arranged to be constrained by means of a constraining device such that the motion of the manipulator is physically constrained in at least one degree of freedom, and thereby enable a constrained manipulator motion and correspondingly a constrained motor motion for the at least one axis. The control system is further arranged to:

command the manipulator to approach a set of target poses where for each target pose a physical pose is reached in which the constrained manipulator motion can be performed, which includes a non-zero constrained motor motion;

perform friction-aware control of the constrained manipulator motion for a period of time while monitoring quantities related to motor torque and to motor angle of the at least one axis;

perform an identification of a set of kinematic parameters for an elasto-kinematic model that includes at least one known quantity representing the at least one elasticity, the identification being based on the monitored quantities and on elastic properties of the manipulator, and determine the at least one geometric property of the manipulator based on the identified set of kinematic parameters of the kinematic model.

The same mentioned positive effects achieved by the method may also be achieved with the system.

According to some embodiments, the constraining device is designed with at least one clamping point to be used for constraining motion of the manipulator by clamping the manipulator to the at least one clamping point.

According to some embodiments, the constraining device comprises a constraining item designed with a plurality of clamping points where the relative transformations between the clamping points are known.

According to some embodiments, the constraining device comprises a tool exchanger with one clamping point.

According to some embodiments, the tool exchanger supports a plurality of docked orientations.

According to some embodiments, the constraining device comprises an offset item arranged to offset the tool exchanger such that the rotation axis of the tool exchanger is non-parallell with the rotation axis of a link that the tool exchanger is attached to.

According to some embodiments, the respective position and orientation of the at least one clamping point is/are unknown.

According to some embodiments, the constraining device comprises a ball-bar mechanism.

According to a seventh aspect, the disclosure relates to a constraining device to be used in a system or method as disclosed herein, wherein the constraining device comprises at least one clamping point.

According to some embodiments, the constraining device comprises a constraining item with at least one clamping point.

According to some embodiments, the constraining device comprises a plurality of clamping points where the relative transformations between the clamping points are known.

According to some embodiments, the constraining device comprises at least two clamping points whereof one clamping point in a first plane and another clamping point in a second plane where the first plane and the second plane are non-parallell. Thereby final-axis (the one comprising the end-flange) motions may result in reorientation of the wrist axes such that the geometry of the wrist becomes possible to identify from the motor side, while still being suitable for tool attachments (within the user application). Also other axes than the wrist axes will normally be in other positions when changing clamping point, but normally not sufficiently much to enable accurate identification of the geometry of those axes.

According to some embodiments, the constraining device comprises at least two clamping points separated by a distance corresponding to at least half the length of a wrist link of the manipulator. Thereby also geometric properties of the final axis are possible to identify. Further, the identification of the wrist properties is well conditioned.

According to some embodiments, the constraining device comprises an angular offset item designed with two opposite non-parallel attachment sides.

According to some embodiments, the constraining device comprises an elongated offset item with two elongated attachment sides.

According to some embodiments, the constraining device comprises a tool exchanger with one clamping point, wherein the tool exchanger supports a plurality of docked orientations.

According to some embodiments, the tool exchanger comprises a tool changer and a thereto mating tool connector.

According to some embodiments, the constraining device is arranged to be automatically attached between a manipulator and a fixed point in a workspace of the manipulator. For example, the constraining device may be pneumatically attached by means of the tool exchanger locking mechanism, and controlled from the robot controller.

By the method and system, non-linear non-geometric properties, i.e., the parameters and models representing those properties, are in a non-invertible case such as gearbox play and joint friction managed by avoiding the effects of them by adapting the motions of the manipulator. Otherwise, for smooth non-linear compliance, the effects of the non-linear non-geometric properties are inverted such that arm-side joint angles and torques acting on linear compliant links can be computed from motor signals. However, there may be internal forces within the kinematic structure, for which the geometric properties are to be determined, such that parameters describing the geometric properties are not describing the transformation from one joint to the next over a compliant link.

The physical effects of the non-geometric properties may be momentarily fixed, e.g. under a constant force resulting in a fixed deformation, resulting in that the geometric properties are momentarily different, but by relating the non-geometric properties (i.e., the component stiffness matrix for each link) to the geometric properties such as the angle between two axis of rotation for the consecutive joint, the true (unloaded) geometric properties can be determined. The geometric properties can be linear, in which case the stiffness parameters are constant in local coordinates, as part of a so called component stiffness matrix. The method provides a novel uniform way of determining both link and joint compliance (as captured by Eq. 14 and 15 in the following), permitting a single set of experiments and computations that enables autonomous calibration. An experiment here corresponds to a single target pose. A single set of experiments thus corresponds to a single set of unique target poses. Autonomous calibration means a robot calibrating itself by means of its controller or control system.

In the case of non-linear non-geometric properties, the method comprises two alternatives. In the first alternative the equations (Eq. 14 and 15) are extended by using functions (Eq. 10) instead of the stiffness constant of the linear case, thereby extending the autonomy of the method to manage the non-linear case. The second alternative is to manually or automatically manage the non-linear effects in a separate step, by adjusting data obtained from monitoring of the motor signals such that each load case corresponds to a linear case. This second alternative can be useful when analyzing the effects of unmodeled effects. For brevity, the following description is mainly expressed in terms of linear compliance.

Summarizing, in general terms, the present invention builds on combining:

Extensive and novel usage of readily available internal controller signals, in particular motor torques.

Appropriate models and formalisms that enables both accurate modeling of small/elastic deviations and kinematic structures, such that identification of parameters is supported.

Principles of constraining motions in mechanically feasible ways such that the method can be applied to standard (not a-priori instrumented) robots.

A commanding and control strategy that instead of averaging from existing time-consuming methods, avoids the effect of known unknowns: the effect of static friction for non-zero forces, and the location of arbitrarily placed clamping points.

Arrangement of equipment and software for controller configuration such that handling calibration can be automated and integrated into the application, even on a user-level of the system and programming.

BRIEF DESCRIPTION OF THE DRAWINGS

FIGS. 9a-9c shows minimal forms of combined joint and link forces and deformations, going from one-dimension (1D) to two-dimensions (2D) such that the three-dimensional (3D) case that due to complexity is described by equations only is easier to understand and apply by the skilled person.

DETAILED DESCRIPTION

Definitions

Figure 1:
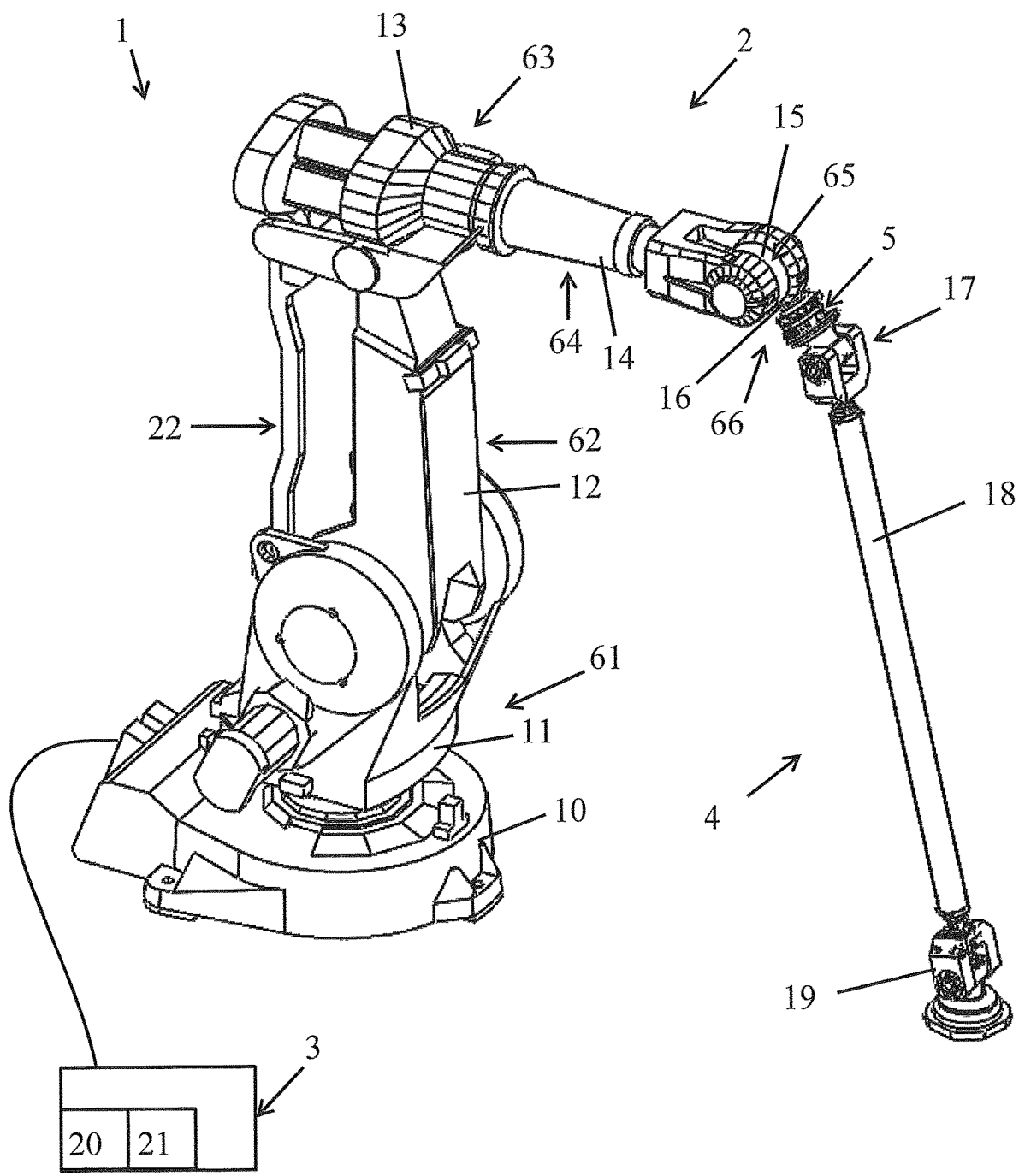
FIG. 1 shows a system for determining the geometric properties of a manipulator according to one embodiment of the disclosure.

Robot: A combination of a manipulator and a controller that is configured to control the movement of the one or several axes of the manipulator.

Manipulator: A mechanical arm comprising one or several axes forming one or several kinematic chains.

Axis (plural: axes): A joint and a linkage, including motor for actuation and any drive train. The motor may be a servo motor, following setpoints from the controller.

Linkage: One or several links that are interconnected by joints.

Stiffness: Is the rigidity of an object, defined as $$k = \frac{F}{\delta}$$

for an elastic object with one DOF, where F is the force applied to the object, and δ is the displacement produced by the force along the same DOF, or $$k = \frac{M}{\theta}$$

defining rotational stiffness, where M is the applied moment or torque, and θ is the rotational displacement produced by the applied moment, or $$k = \frac{M}{\delta}$$

describing how torque gives rise to translation, or $$k = \frac{F}{\theta}$$

describing now force gives rise to rotational displacement.

Compliance: The inverse of stiffness in case of pure elastic effects. Locally for one axis of a manipulator, compliance can for example be formed by the elasticity of a link, which normally can be assumed to be linear as deformation are small compared to the dimensions (as normally assumed in solid-state mechanics). Compliance of a joint may also be linear and thereby form an elasticity of the axis. It may instead be non-linear, which may be experienced as backlash or lost motion, either in the direction of the intended motion or orthogonally. For a manipulator in total, the kinematic configuration and joint transmission properties normally results in a non-linear compliance even if only elastic effects are involved.

Compliant link: A non-rigid link. A compliant link has its mass distributed between the two joints it connects and therefore formally has infinite DOF and infinite series of resonant modes due to the physics of a distributed mass. For the current disclosure only the lowest resonance frequency is relevant (measured in free motion and used as a performance limitation and not part of the core of the method). Correspondingly, the inertia of the link itself can be approximated by a lumped mass at the center of gravity. Moreover, the elasto-dynamic model determined in clamped configuration is the corresponding quasi-static model that is sufficient for compensation for deviation due to process forces. With this simplification, a compliant link is considered to have six additional DOF that specify the end of the link (the pose of next joint in the kinematic chain) relative to the beginning of that link (the pose of the preceding joint).

Component stiffness matrix: A matrix used to model component deformation such as link deformation due to the joint forces and/or torques. The stiffness matrix is normally used as a linear mapping, assuming link deflections are small compared to link sizes and motions. Nonlinear stiffness can be accomplished by elements varying with the load. The link deformation can be defined in a local coordinate system of the link and thereafter transformed to a global coordinate system.

Manipulator stiffness matrix: Whereas a component stiffness matrix may be constant, the stiffness of the manipulator varies with the configuration, which is defined by the joint coordinates (having manipulator-DOF elements). Here, the difference between the motor and the link translation can be omitted in practice, since even large drive-train effects have a rather small influence on the translation. That is, apart for singular poses the motor angles give the joint angles sufficiently well. For each single configuration the link stiffness matrices can be put together, thereby forming a larger Manipulator stiffness matrix (MSM). The MSM is also referred to as Global stiffness matrix, which potentially can include also one or several peripheral devices.

Orthogonal joint compliance: The compliance of a link in any direction that is orthogonal to the motion described by a free coordinate of the joint representing the motion of the joint. The linear part of the orthogonal joint compliance can be incorporated in the component stiffness matrix, whereas the non-linear part such as bearing backlash needs to be treated separately.

Geometric properties: The properties of link shapes in their unloaded condition, and the relations between their axis of motion as described by the joints, are geometric properties. Also the ideal gear ratio between the motor and the link side of a joint is a geometric property. The geometric properties of a manipulator is the complete set of geometric properties of all the joints and links of the manipulator including its mounting to the environment. Such properties include link lengths, angles between axis of rotation, gear ratios, motor offsets and homing positions of joints and motors. The at least one geometric property of the manipulator may be related to any of an axis, a link, a joint, a transmission or a motor, of the manipulator.

Non-geometric properties: Properties that are not geometric, reflecting physical effects such as deformation due to force, friction in joint transmissions, and lost motion due to gearbox play or non-linear compliance. While geometric properties (or rather the states of the system or components exhibiting those properties, as represented by the generalized coordinates of the motion) are invariant under change of load (forces and torques from motors, gravity, dynamics of motion, and external so called process forces), non-geometric properties define how the system changes state due to the forces acting on it.

Isostatic: A property of a kinematic system, commonly referred to as statically determinate, stating that regardless of non-geometric properties the internal forces and reaction forces are uniquely defined when the system, such as a kinematic chain, is in a static equilibrium.

Hyperstatic: A property of a kinematic system, commonly referred to as statically indeterminate, the system typically comprising at least one mechanically closed kinematic chain, in which internal forces depend on non-geometric properties.

Elasto-kinematics: Whereas kinematics is the description of motions without considering masses and forces, the kinematics used in robot controllers is limited to motions of jointed rigid bodies/links, which is also dominant in the scientific community. That is, while some non-geometric properties may be used for adjusting the programmed robot poses, only geometric properties are used when generating servo setpoints, for example to have the end-effector moving along a straight line. In the following, kinematics is practically extended to also deal with compliant links, utilizing a subset of the non-geometric parameters.

In the following, a method for determining geometric properties will be described. For ease of understanding the method, a proposed system for implementing the method will first be described:

System

Figure 7:
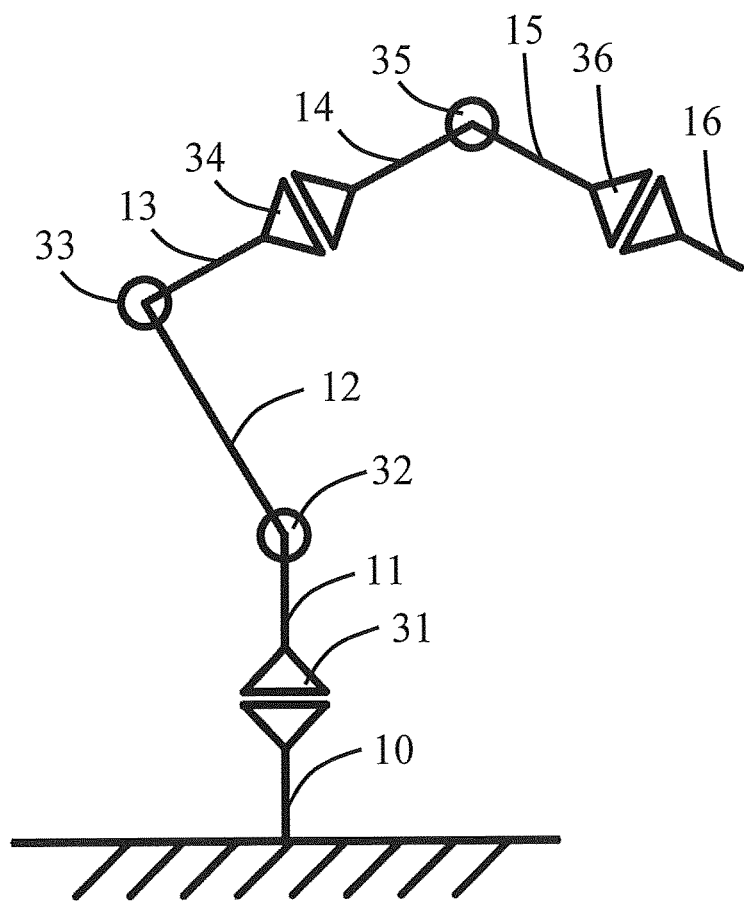
FIG. 7 illustrates a kinematic chain representing the manipulator in FIG. 1, corresponding to the rigid-body case in a certain configuration, and with both joints and links enumerated.

In FIG. 1 a system 1 according to one embodiment is illustrated and will now be explained with reference to this figure. The system 1 comprises a manipulator 2, here represented by a robot with six rotational joints and six movable links. The kinematic structure is depicted in FIG. 7, with a configuration such that each joint (i.e., the center-line of rotation) is either orthogonal to the plane of the FIG. 7 (the plane of the FIG. 7 is defined with the circles denoting joint 2, joint 3, and joint 5, which are numbered 32, 33 and 35 respectively) or rotational in the plane of the manipulator 2 (the plane of the manipulator 2 is defined with the double triangles denoting joint 1, joint 4 and joint 6, which are numbered 31, 34 and 36 respectively). Such a six joint manipulator 2 is also referred to as a six DOF manipulator, which means that it in non-singular configuration (within its workspace) can position an end-effector attached to the tool-mounting flange in six DOF, as needed in most applications. In general, and as assumed in the following, the manipulator 2 may comprise any number of joints, i.e. one or a plurality of joints, and any number of links connected to the one or several joints, in serie or in parallel, and the numbers are not critical for performing the invention.

Each joint is configured to be actuated by an actuator such as a motor (not shown), either directly or indirectly via a transmission (not shown), such that motor rotations are translated into lower-speed motions. For simplicity, the actuators/motors and drive-trains being part of each axis are not shown, but will in the method be referenced via equations that express the effect of the transmission on the end-effector motion.

Each link 1 to 6, numbered 11 to 16 respectively, of the manipulator 2, connects a joint with the next joint in the kinematic chain formed by the manipulator 2. The base link 10 preceding the first joint connects the first joint to the floor or ground. The last link 16 in the chain ends with a tool-mounting flange (or end flange). A tool exchanger 5 can be mounted on to the tool-mounting flange, and various tools or end-effectors may be attached to the tool exchanger 5 on its tool side. A kinematic chain of the manipulator 2 arranged with certain joint angles may also be referred to as a kinematic configuration of the manipulator 2.

Each link or linkage and thereto connected joint and drivetrain arranged to drive the joint forms an axis. Thus, the first joint 31 and the link 11 are parts of a first axis 61, the second joint 32 and the link 12 are parts of a second axis 62, the third joint 33 and the link 13 are parts of a third axis 63, the fourth joint 34 and the link 14 are parts of a fourth axis 64, the fifth joint 35 and the link 15 are parts of a fifth axis 65 and the sixth joint 36 and the link 16 are part of a sixth axis 66.

The system 1 further comprises a control system 3 that includes a controller of the industrial robot 1. The control system 3 comprising a processor 20 and a computer readable storage unit 21. The control system 3 is configure to control manipulator, i.e. the joints of the manipulator, to different target poses.

The system 1 also comprises a constraining device 4, here a double-ball-bar mechanism 4, that closes the kinematic chain formed by connecting it via the manipulator 2, optionally via the tool exchanger 5, and the ground/floor. The double-ball-bar mechanism 4 here includes a first ball-joint 17 attached to the manipulator 2, a bar 18 and a second ball-joint 19 attached to the ground/floor. The bar 18 is attached to the first joint 17 at one end and to the second ball-joint 19 at the other end. The first ball-joint 17 and the second ball-joint 19 are thus interconnected by the bar 18. To permit large angles for the ball-joints 17 and 19, they are better built from combined rotational joints. Hereinafter the first joint 17 is referred to as the Cardanic joint 17, having 2DOF as motivated below, and the second joint 19 is referred to as the Gimbal joint 19, having 3DOF as also motivated below.

Figure 2:
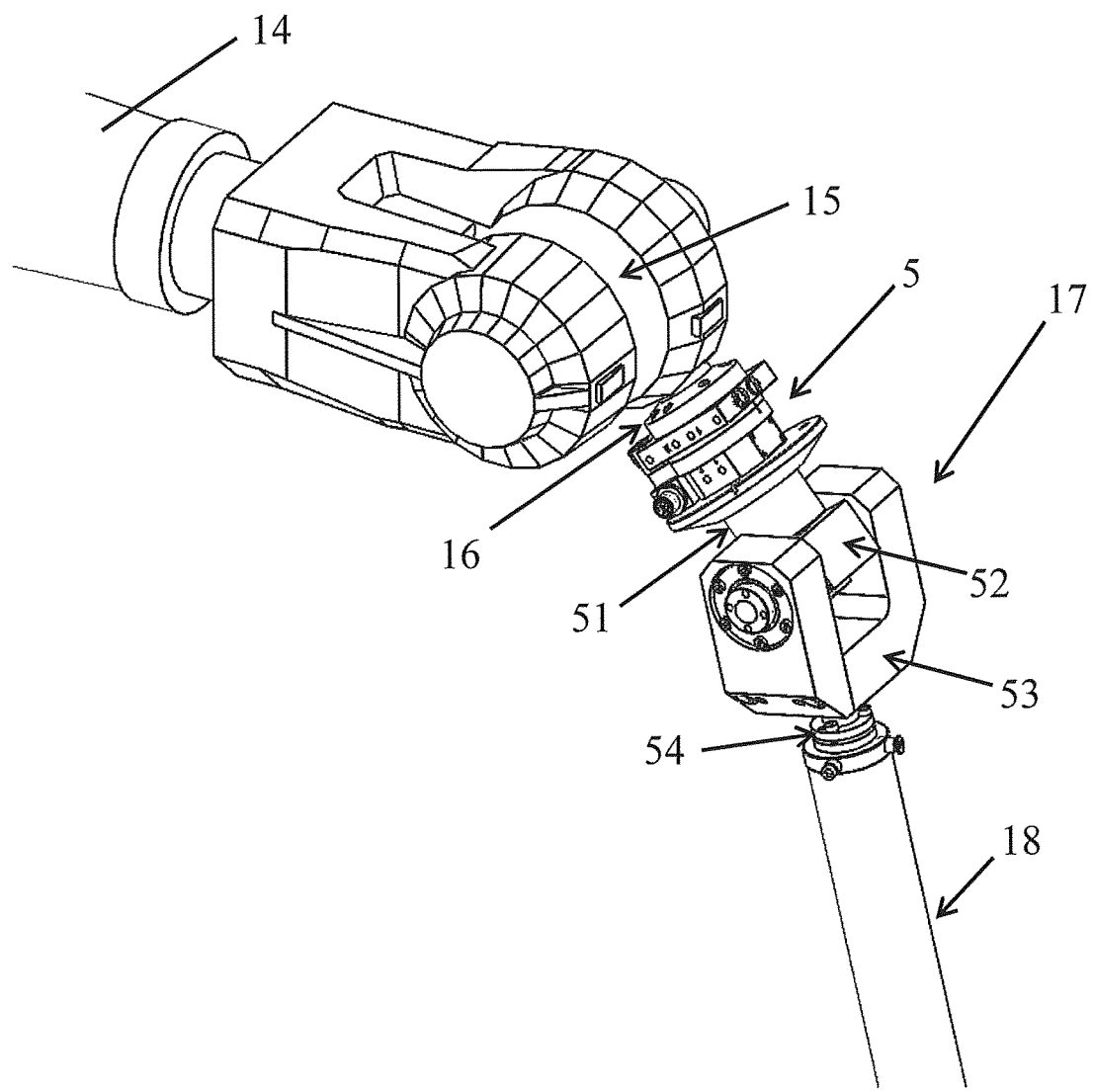
FIG. 2 shows a magnification of part of FIG. 1, including the manipulator wrist, an envisioned tool-exchanger, and a ball-bar with the ball-joint implemented by a Cardanic joint.

In FIG. 2 an enlargement of a part of FIG. 1, including the link 14, thus the manipulator wrist 14, the tool-exchanger 5, and the double-ball-bar mechanism 4 with the first joint 17 implemented by a Cardanic joint. The Cardanic joint 17 includes a connecting link 51, a cross shaft 52 integrated with the connecting link 51, a hinge 53 rotatable holding the cross shaft 52 and a connector 54 connecting the Cardanic joint to the bar 18. The tool-exchanger 5 fits on its tool side with a mating part of the Cardanic joint 17, here the connecting link 51.

The double-ball-bar mechanism 4 can be connected to any of the movable links (here 11-16, or at any place of any possible manipulator) such that the links within the formed kinematic chain include links with parameters to be identified, either as a complete chain to be used in the application or a part of a chain if a narrow analysis is needed in the presence of unmodeled equipment properties. Depending on the kinematics included in the chain to be identified, and on what parameters that are unknown/uncertain, the double-ball-bar mechanism 4 can have different embodiments, as long as the following requirements are fulfilled:

The motion of the manipulator (or parts of it, or of the manipulator together with one or several peripheral devices to be calibrated) is physically constrained (by force/torque interaction). In general terms the double-ball-bar mechanism 4 can be referred to as a constraining device.

The motion involving/exhibiting the geometric properties to be determined is permitted, in some non-empty subspace of the workspace of the manipulator 2 according to the constraints of the constraining device 4. This permitted motion is referred to as constrained motion, which can be considered a result of rigid or compliant links and joints depending on what stage of analysis and use that is referred to.

In the standard case of a 6DOF manipulator 2 as depicted in FIG. 1, with the constraining device 4 connected to the tool flange (via an optional tool exchanger 5), a practical solution is to have the constraining device 4 constraining 1DOF only, thereby permitting it to be connected to practically any part of any type of linkage down to a single DOF. Constraining 1DOF means permitting 5DOF, which in turn means that the constraining device 4 in this normal case should have five joints. Fewer joints can be used during constrained motion, but hyperstatic loads on the assumed 6DOF manipulator must be handled (as is also permitted by the present invention including Equation 14, but otherwise omitted here for clarity and brevity).

For manipulators with DOF greater than six, such as redundant manipulators and dual-arm manipulators, the constraining device 4 can be simplified, typically down to a single link. Such a single link can be considered being a first part of first joint 17, connecting to tool exchanger 5 or to the last link 16, but with an offset (in position and/or orientation, i.e., the last link 16 and the connecting link 51 not having a common centerline as is the case in FIG. 2) between the final joint 36 and the connecting link 51. With such an offset (not shown), the connecting link 51 can be given precise dimensions such that the scaling of determined geometries becomes well defined, which is useful also in the standard 6DOF case if the offset on the final joint 36 needs to be determined.

Correspondingly, as preferred for determining the geometric offset of joint 1 denoted 31 (FIG. 7), the second joint 19 can be placed and fixed at a well known position of link "0", which is the manipulator foot 10. (Alternatively, the geometric offset of joint 1 can be set to an arbitrary value and then determined by a separate 1DOF calibration, using the present invention or by any other means of calibration.)

The preferred embodiment of the constraining device 4, with five passive joints forming a double-ball-bar linkage between the manipulator 2 (or, as mentioned, parts of it, or one or several peripheral devices attached to it) and the floor as illustrated in the figures, means that there are two centerpoints of the spherical motions permitted by first joint 17 and second joint 19. Each of these two joints 17, 19 could (in principle for the method) permit all the 3DOF of the spherical motion, but that would leave 1DOF of null-space motion for the bar 18. That would not be a problem if the geometries of the constraining device 4 are exactly known and having the centerline of bar 18 passing exactly through the centerpoints of the first joint 17 and the second joint 19. However, as a more practical solution that also permits automatic identification of the constraining device 4 and its location, is to have one of the first joint 17 and the second joint 19 providing only 2DOF (and hence the other 3DOF). For practical reasons of weight, we place the 3DOF part on the floor/ground/foot of the manipulator 2, and hence the 2DOF part mounted to the tool exchanger 5. As should be understood, the following method also works in the opposite case. The second joint 19 may according to one embodiment be a Gimbal joint 19. The Gimbal joint 19 includes a rotational joint, e.g. two hinges connected by a cross shaft (not clearly visible).

The connector 54 (see FIG. 2) fixes the bar 18 to the hinge 53, whereas the corresponding connection of the bar 18 to the Gimbal joint 19 is accomplished via the rotational joint of the Gimbal joint 19, preferably with a centerline of the bar 18 crossing a centerpoint of the Gimbal joint 19. In the following, for simplicity of the description, it is assumed that the centerline of the bar 18 is crossing the centerpoint of the Cardanic joint 17.

A preferred embodiment of the system 1 for a standard manipulator implies that the centerpoint of the Cardanic joint 17 is constrained to move on a sphere formed by the constraining device 4. It is hereafter assumed that the constraining device 4 is rigid compared to the manipulator 2, but any external compliant mechanism may be included into the calibration, and the properties of the constraining device 4 can also be determined according to the present invention.

External mechanisms can include actuators, which is a simpler case due to the availability of torque information, but here we assume passive mechanisms. The joints of those external mechanisms can be equipped with position (angular) sensing, which can be used to reduce sensitivity with respect to unmodeled properties of the system 1. Alternatively external joints, such as those five of the constraining device 4 can be without sensing, which then may require more experiments according to the present method to obtain sufficient data for the optimization based on a cost function (such as the following Equation 17) to have a solution with low residuals. Thus, the manipulator 2 is constrained to move such that the centerpoint of the Cardanic joint 17 (i.e., the center of cross shaft 52 in FIG. 2) is located on a spherical surface. This clearly permits a variation of joint positions and manipulator wrist orientations, such that the geometric properties of the manipulator 2 influence the motions of the joints within the formed kinematic chain.

A couple of other implications of the following method deserve being mentioned, although not further treated here.

Depending on manipulator properties and maximum angles of the joints of the constraining device 4, it can even be the case that manipulator joint torques are controlled such that a resulting (pull or push) force in the direction of the bar 18 is sufficiently exciting for determining the non-geometric properties.

In case of a parallel-kinematic manipulator, the system 1 can be extended in a straightforward manner by adding (to the Equation 9) the properties of each kinematic chain. For the manipulator shown in FIG. 1, the parallel bar 22 is managed that way.

For any of the above embodiments of the constraining device 4, there will in practice be some friction in each joint. However, that friction can be made insignificant by a suitable mechanical design since the joints of the constraing device 4 are normally passive (having no trasmission and no actuator). In the case of significant external friction, this can be measured separately and compensated for in a straightforward manner unless the joint motion is so slow that static friction develops, which is a case that (by omission of the corresponding data) should be excluded from the identification. Since the constrained motions can be selected freely within a comparably large permitted subspace, and the detailed modelling results in that rather small data sets are needed for identification, omitting data (or avoiding those poses in the first place) is not a problem.

Opposed to the marginal friction of external passive joints of constraining devices, friction in the manipulator joints typically is significant. In normal control of the manipulator within the application, friction effects are managed within the controller by various combinations of feedforward and feedback solutions, and hence joints that are controlled in the standard (unchanged) way as default for the controller 3 do not form a problem. Also with standard control the motor torque and motor angle can be monitored.

A friction effect can be either static or dynamic, or both. Static effects include that the manipulator does not quite reaches its target pose due to friction after the joint transmission, in combination with a compliant transmission due to lack of stiffness. In this case the motors settle at the programmed positions, due to integral action in the controller. Dynamic friction effects include the motor control not settling to the programmed position, typically due to a combination of Columb friction, stiction, motor torque ripple, and quantization of the motor angle sensing. Due to the low-pass characteristics of the manipulator from a frequency point of view, such limited motor vibrations might not be practically visible on the end-effector, but for avoiding friction effects within the manipulator structure some extra care is typically needed, such as disabling integral action and lowering the feedback gain. Another dynamic friction effect are transients at start and stop of motion. In this case the friction effects are hard to model/predict, and hence difficult to exclude from the geometric identification. Friction effects are normally very dependent on specifics of the hardware, and hence hard to generalize further. Friction-aware control here refers to control adapted according to the manipulator properties at hand such that the friction can be practically exluded from identification of the geometric parameters.

During contrained motions for obtaining geometric parameters in the presence of elasticity as of the present invention, however, avoiding the effect of friction is of key importance since motor torques and detailed models are extensively used for improving the accuracy. As for the external passive joints of the constraining device, static friction can be avoided by selecting and omitting certain motions, and for friction during normal motion compensation this is straightforward based on the proposed models and identification.

The above described arrangements with a ball bar mechanism includes obtaining well-defined friction forces/torques, and thereby predictable effects, which means that retained data from monitored motions reflects the situation that friction is fully developed with a known force/torque. Friction effects then includes both Columb and viscous effects, but without static friction since that friction would be unknown (without additional torque sensing that would have been costly). Performing the method with the ball bar mechanism is thus considered as a first alternative to accomplish well-defined friction forces/torques.

A second alternative to accomplish well-defined friction forces/torques would be to ensure unloaded static friction, meaning that both velocity and friction would be zero. A zero velocity may seem to contradict the need for position change (in order to obtain geometric parameters), but by turning difficulties to advantages the present invention includes alternative embodiments of a system without the ball-bar mechanism. These embodiments will be described in the following with reference to FIGS. 4-6. The mentioned difficulty here is the compliance, possibly being non-linear, which is a major issue in earlier kinematic calibration systems. Here, instead, we first realize from WO2014065744 and WO2015030650 that with the manipulator being first exercised in free-space motions and then fixed in a clamped pose, the manipulator can be set in an unloaded (practically zero static friction) and resting (practically zero velocity) pose. This pose is defined by the mid-point of all 6 clamping curves for a 6DOF manipulator, and it also applies to manipulators with DOFs less than 6 (by applying the hyperstatic models or by introducing a passive joint within the clamping) or more than 6 (by fixing motor angles for null-space motions to some desired kinematic configuration, and the motor torques to be equal to the influence of gravity).

A third alternative to accomplish well-defined friction forces/torques is to accomplish zero velocity in a loaded position by reaching that position by friction-aware control such that zero-speed is reached from one defined torque direction. That is, considering joint and link properties, the controller 3 controls the motor to move in a single direction until a position corresponding to the rigid backlash-free position is reached. A disadvantage compared to the second alternative above is that non-geometric parameters such as joint friction needs to be more accurately known, but an advantage is that a clamped pose for identification of geometric parameters does not need to load the end-effector with the gravity forces (as in the second alternative when the motor torque needs to be close to zero). This third alternative is preferable when, for instance, an end-effector for milling is mounted on a large robot and the tool itself (the so-called mill bit, not standing the gravitational forces of the largerobot) is clamped to obtain best accuracy at the point of cutting.

Figure 3:
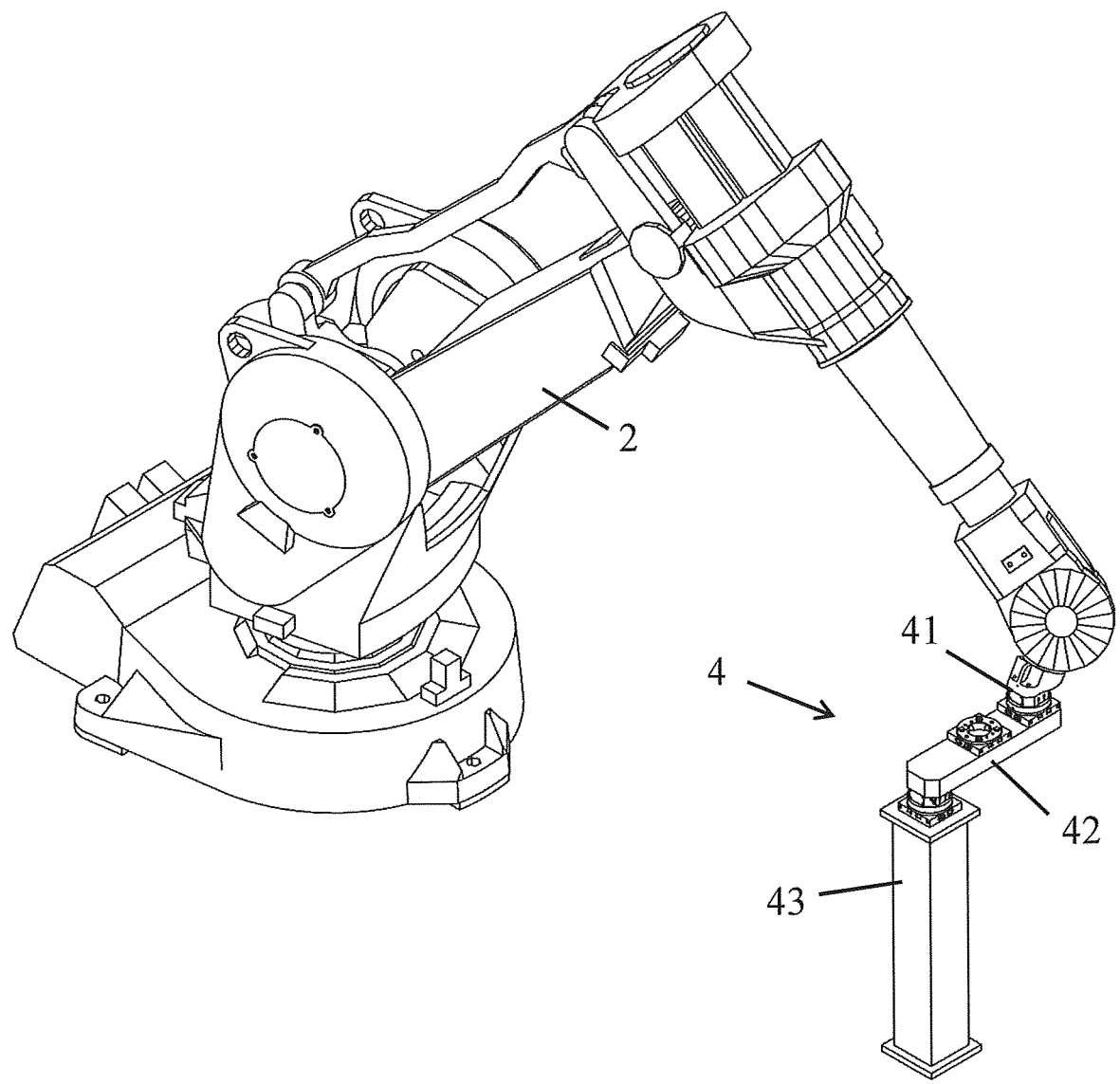
FIGS. 3-6 illustrate different examples of a constraining device.

To actually obtain geometric parameters, it then remains to permit a known (absolute or relative) motion between constrained target poses in which the uloaded resting state is reached as described. The idea here, with systems implications on the following method, is that motions between constrained poses, hereafter referred to as commanded motions, do not need to be constrained, assuming the control at the commanded target pose is constrained and that the locations of the constrained poses are known at least relative to each other. An embodiment that avoids external joints is shown in FIG. 3; a constraining device 4 with a tool exchanger assembly 41 and two different types of constraining items 42, 43 with mounted tool exchanger parts can be arranged in a variety of ways, each providing a well-defined displacement of the clamped pose, which after control to unloaded resting state results in a data point (i.e. motor torque and motor angle) to be used according to the following method. The constraining device 4 in FIG. 3 and other exemplary embodiments of a constraining device 4 will be explained more in detail to these figures in the following.

Fix clamping of a mechanical device such as a robot, is the procedure where at least one mechanical joint is directly or indirectly firmly attached to the environment. In the case where the mechanical device has one degree of freedom, it will be completely constrained and an infintely stiff mechanical device would not be able to move its joint. Fix clamping of the end-effector of a standard industrial robot with six axes in a non-singular configuration would constrain the movement of all robot joints. One way to clamp a manipulator is to use a standard tool exchanger, attaching the tool connector to the environment and the tool changer to the manipulator 2, and then docking the tool changer to the tool connector.

During normal operation of a robot system the manipulator of the robot system will try to follow position commands programmed or commanded by the operator. Errors between actual and commanded position will automatically be minimized by the system. When the system is commanded to a unattainable position, for example a position below the ground, the manipulator will exert strong actuation forces/torques on the ground as a result of the position error. The robots safety system will try to halt operation before any damage is caused. This behaviour may increase the diffculty of fixating the manipulator to the environment during normal operation. This can be remedied by limiting the torque or entering a compliant mode of the manipulator, where errors in position are only reduced proportionally. Thus, before the method is performed, the manipulator may be set to a compliant mode. The method will then be performed in the compliant mode. Alternatively, the torque of the manipulator may be limited, and the method performed with the manipulator in a limited torque mode. Within one manipulator, different joints may be configured to use different types of controls and compliant modes, even subject to change while performing the method. For instance, poses to be approached may be selected such that axes with very high friction or gravity can remain with standard control, while the wrist axes are made compliant.

During fixation of the manipulator, it is commanded by a position reference. It is probable that the commanded position is slightly different from the true position in space. This difference will be seen by the robot system as an error, giving rise to a non-zero torque. Since only position commands are allowed in a standard robot system, a search is performed to find the command position where the resulting torques are close to zero. Each motor position command is slightly changed to find the correct search direction. When the correct direction is found, the position command is changed in small steps to ensure safe operation. This is repeated until all actual torques are close to zero. Further details on the clamping method can be found in WO2014065744.

To identify the kinematic parameters of a robot, the position and/or orientation of the end-effector must be known. Several joint positions are needed to identify the parameters. By using the described method, and constraining motion by clamping to points where the position and/or orientation of a clamping point is known in a coordinate system known to the robot system, the obtained joint values can be used for calibration. The clamping point can be known either by precise mechanical design from a CAD-model, or measured by an external measurement system. With the obtained values from the robot's internal joint sensors the kinematic parameters of the manipulator can be identified.

It is however uncommon that robot cells contain known clamping points, which makes fix clamping to known points difficult to use in practice. Clamping the robot to a single unknown point does not give any information on the kinematic parameters of the robot, as the position and orientation of the clamping point is unknown. By having multiple clamping points with the relative transformations known, the position and orientation of the first clamping point can be seen as additional parameters in the identification, and the same method as in the case of clamping to known points may be used.

A drawback of using unknown clamping points is that it is not possible to identify all kinematic parameters of the robot. It is impossible to separate the contribution from the position of the clamping point and the position and motor offset of the first joint of the robot. For instance, moving the rotation axis of joint 1 cannot be separated from moving the clamping point. Therefore, if a full geometric calibration is desired, an additional method is needed to identify the kinematic parameters of the first joint of the robot.

The scenario with unknown clamping points, but where the relative transformation between the points is known can be achieved in a number of ways.
1. An object, such as a plate or a cube, with a number of clamping points can be manufactured with high precision such that the relative transformations between the clamping points can be assumed to be known with sufficient accuracy. This embodiment is exemplified e.g. by the second constraining item 42 in FIGS. 3-6.
2. Using a tool exchanger 46 (FIGS. 3-6) where the tool exchanger can be locked in a number of different position, for instance by rotating it, whereby it is possible to get multiple robot configurations (target poses) from the same clamping point. Excitation of the joints is increased if the rotation axis of the tool exchanger does not coincide with the last joint of the manipulator, for instance by using an angular offset item 45 (FIGS. 3-6) between the manipulator and the tool exchanger. More clamping configurations can be achieved by adding an additional offset item, an angular offset item 45 or an elongated offset item 47 (FIGS. 3-6), and tool exchanger pair in series with the first. If the tool changers can be locked in eight (8) different positions (45 degrees rotation between each locking position), a total of 64 different clamping configurations would be possible. Illustrating embodiments are shown in FIGS. 3-6.
3. A combination of the two alternatives described above. Illustraing embodiments are shown in FIGS. 3-6.

Thus, FIGS. 3-6 illustrates a plurality of different embodiments of a constraining device 4, which will now be explained with reference to these figures.

For each of the non-limiting embodiments illustrated in FIGS. 3-6, and for the double-ball bar embodiment illustrated in FIGS. 1 and 2, the manipulator 2 is arranged to be controlled by the control system 3 for moving the end-effector of the manipulator 2 to target poses. At least one axis of the axes of the manipulator 2 exhibits, that is, comprises, at least one elasticity. In each of the embodiments, the manipulator 2 is connected to a constraining device 4. The motion of the manipulator 2 is thus constrained by the constraining device 4, such that the motion of the manipulator 2 is physically constrained in at least one degree of freedom, and thereby enable a constrained manipulator motion and correspondingly a constrained motor motion for at least one axis of the manipulator 2. The control system 3 is further configured to command the manipulator 2 to approach a set of target poses where for each target pose a physical pose is reached in which the constrained manipulator motion can be performed, which includes a non-zero constrained motor motion. The control system 3 is further configured to perform friction-aware control of the constrained manipulator motion for a period of time while monitoring quantities related to motor torque and to motor angle of the at least one axis. The control system 3 is further configured to perform an identification of a set of kinematic parameters for an elasto-kinematic model that includes at least one known quantity representing the at least one elasticity, the identification being based on the monitored quantities and elastic properties of the manipulator, and to determine the at least one geometric property of the manipulator 2 based on the identified set of kinematic parameters of the kinematic model. The elastic properties may be represented by corresponding parameters, which can be predetermined for known properties.

Now refering to FIG. 3, which illustrates the manipulator 2 with its end flange connected to a constraining device 4 according to one example. The constraining device 4 is rigidly attached to a floor, and the manipulator 2 (that is also rigidly attached to the floor) and the constraining device 4 thus creates a closed kinematic chain. The motion of the manipulator 2 is thus constrained by the constraining device 4, such that the motion of the manipulator 2 is physically constrained in at least one degree of freedom, and thereby enable a constrained manipulator motion and correspondingly a constrained motor motion for the at least one axis. The constraining device 4 here comprises a tool exchanger assembly 41, and a plurality of constraining items, here a first and a second constraining item 42, 43. The tool exchanger assembly 41 and the constraining items are interconnected. The constraining device 4 is locked in position, e.g. by pneumatic means controlled from the control system 3. Another alternative to enable automatic clamping, docking and/or locking is e.g. to have friction connections with splines. Each tool exchanger is arranged with a locking device. The locking device may be pneumatic based or friction based. The pneumatic based locking device may comprise balls in a cavity that by air pressure are locked into place and thereby secure docking of a tool changer to a tool connector, or opposite. The manipulator 2 is in the constrained state commanded to approach a set of target poses. One of these poses is illustrated in FIG. 3. The manipulator 2 is then exposed to friction-aware control of the control system 3, such that desired data, that is quantities related to motor torque and to motor angle of at least one axis, in most cases for several axes, can be retrieved. The desired data is data that enable determination of at least one geometric property of the manipulator.

Each constraining device 4 is designed with at least one clamping point to be used for constraining motion of the manipulator 2 by clamping the manipulator 2 to the at least one clamping point. Clamping points will be more explained in the following.

Figure 4A:
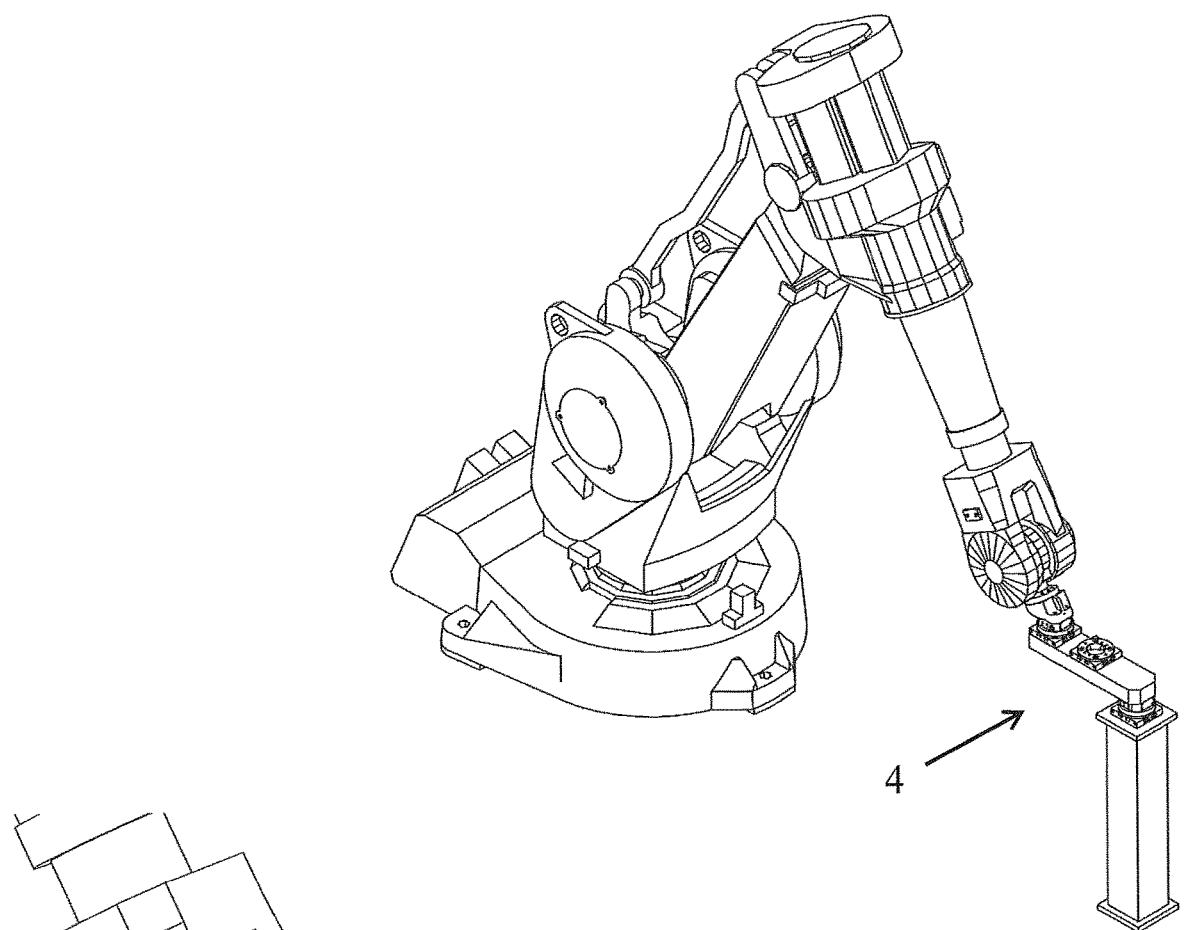

In FIG. 4a the manipulator 2 is illustrated constrained by the same constraining device 4 as in FIG. 3, but in another target pose. The constraining device 4 is also in another configuration, that is, it has been moved such that a new target pose is possible. This movement is encompassed by the command step. The movement is controlled by the control system 3, when commanding the manipulator 2 to approach the another target pose.

Figure 4B:
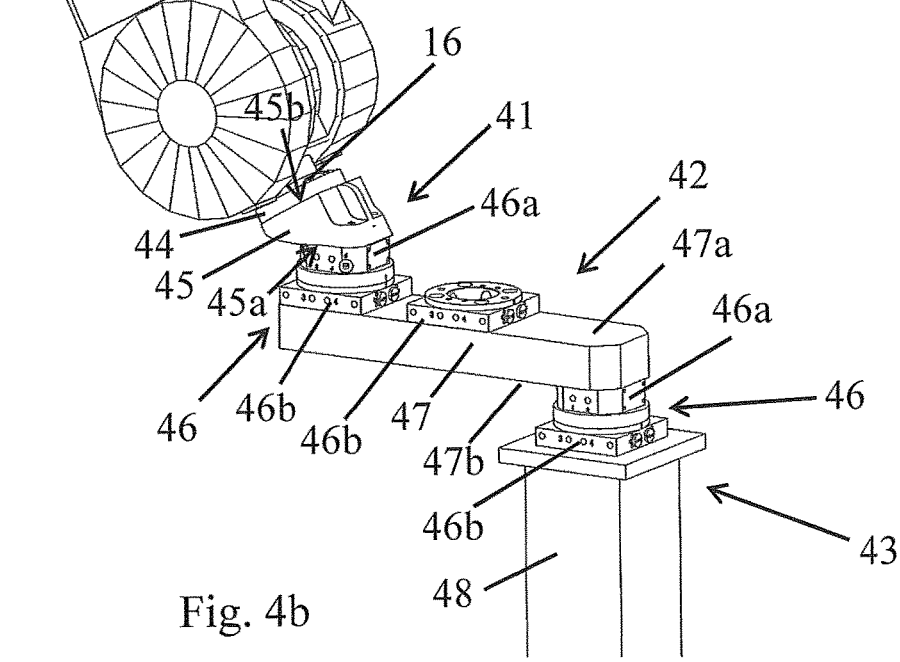

FIG. 4b illustrates an enlarged view of the constraining device 4 of FIG. 4a. The tool exchanger assembly 41 comprises an angular offset item 45 and a tool exchanger 46 comprising a tool changer 46a and corresponding mating tool connector 46b. A tool changer 46a and a thereto mating tool connector 46b are thus referred to as a tool exchanger 46. The tool connector 46b defines a clamping point for the manipulator 2. The tool connector 46b and the mating tool changer 46a defines the same clamping point. In other words, the tool exchanger 46 comprises one clamping point. In some embodiments, the tool exchanger 46 supports a plurality of docked orientations. The tool changer 46a and the mating tool connector 46b may thus be rearranged in a new orientation, while still in the same clamped point. The tool exchanger 46 may support e.g. 1, 2, 4, 6, 8, 10 or 12 different docked orientations. The angular offset item 45 is arranged intermediate the end flange 44 and the tool changer 46a. The angular offset item 45 is arranged to offset the tool exchanger 46 such that the rotation axis of the tool exchanger 46 is non-parallell with the rotation axis of a link that the tool exchanger 46 is attached to, here the sixth link 16. Further, the angular offset item 45 is designed with two opposite non-parallel attachment sides 45a and 45b (see FIG. 4b). The side 45b is arranged to the end flange 44. The other side 45a is arranged to the tool changer 46a. The angular offset item 45 may further be designed with a cavity to enable attachment of the side 45b to the end flange 44, e.g. with bolts. The angular offset item 45 defines an angle between its non-parallel attachment sides 45a, 45b that is between 15°-45°, for example 30°. The angle between the sides 45a and 45b may be constant, or varied. Each side may also be referred to as a plane. The plane of the side 45a and the plane of the side 45b are thus non-parallel. The tool exchanger assembly 41 defines one clamping point, that is the clamping point of the tool exchanger 46. The clamping point of the tool exchanger 46 is defined in a first plane, i.e. here an attachment plane of the tool exchanger 46. The attachment side 45a defines a second plane. The first plane and the second plane are non-parallel. The angular offset item 45 is designed to have a comparably low weight (compared to the rest of the manipulator 2). The first constraining item 42 comprises an elongated offset item 47, two tool connectors 46b and a tool changer 46a. The elongated offset item 47 has two elongated attachment sides 47a and 47b. The tool connectors 46b are arranged along a first attachment side 47a, and the tool changer 46a is arranged along a second attachment side 47b of the two elongated attachment sides. The first and second elongated attachment sides 47a, 47b are here parallel. The tool changer 46a and tool connectors 46b each define a clamping point for the manipulator 2. The relative transformation between the clamping points is exactly defined and known. In other words, the first constraining item 42 is designed with a plurality of clamping points where the relative transformation between the clamping points are known. The clamping points are separated by a distance corresponding to at least half the length of a representative wrist link (having a distance between its line of motion and the end flange, in this case link 5 as for most robots) of the manipulator 2. One of the tool connectors 46b of the second constraining item 42 is connected to the tool changer 46a of the first constraining item 41. Here, it is the most distal of the tool connectors 46b that is connected to the tool changer 46b.

The second constraining item 43 comprises a tool connector 46b connected to a fix point in space, here a pedestal 48. The pedestal 48 is rigidly attached to the floor. The tool changer 46a of the second constraining item 42 is connected to the tool connector 46b of the second constraining item 43.

According to some embodiment, the respective position and orientation of the at least one clamping point are unknown. Thus, control system 3 can determine at least one geometric property of the manipulator 2 when docked to clamping points that have unknown absolute position and orientation. According to some embodiments, at least one parameter of the position or orientation of the at least one clamping point is unknown. Thus, the position can be defined with three coordinates (x, y, z) and the orientations defined with three angles ($\alpha$, $\beta$, $\gamma$). Any, several or all of the parameters (x, y, z) and ($\alpha$, $\beta$, $\gamma$) may thus be unknown.

According to some embodiments, the constraining device 4 is arranged to be pneumatically attached between a manipulator 2 and a fixed point in a workspace of the manipulator 2. All the parts of the constraining device 4 is thus arranged with fluid lines, ports etc. to support pneumatic control of the constraining device 4, and thereby enable reorientation of the tool exchangers 46 and repositioning of the tool exchanger assembly 41 and the constraining items 42, 43, 49.

Assuming that all tool exchangers can be locked in four different orientations, the total number of possible unique clamping poses becomes 292, considering all combinations of the tool exchanger assembly 41, and the constraining items 42, 43, and 49 (FIG. 5).

Figures 5A, 5B:
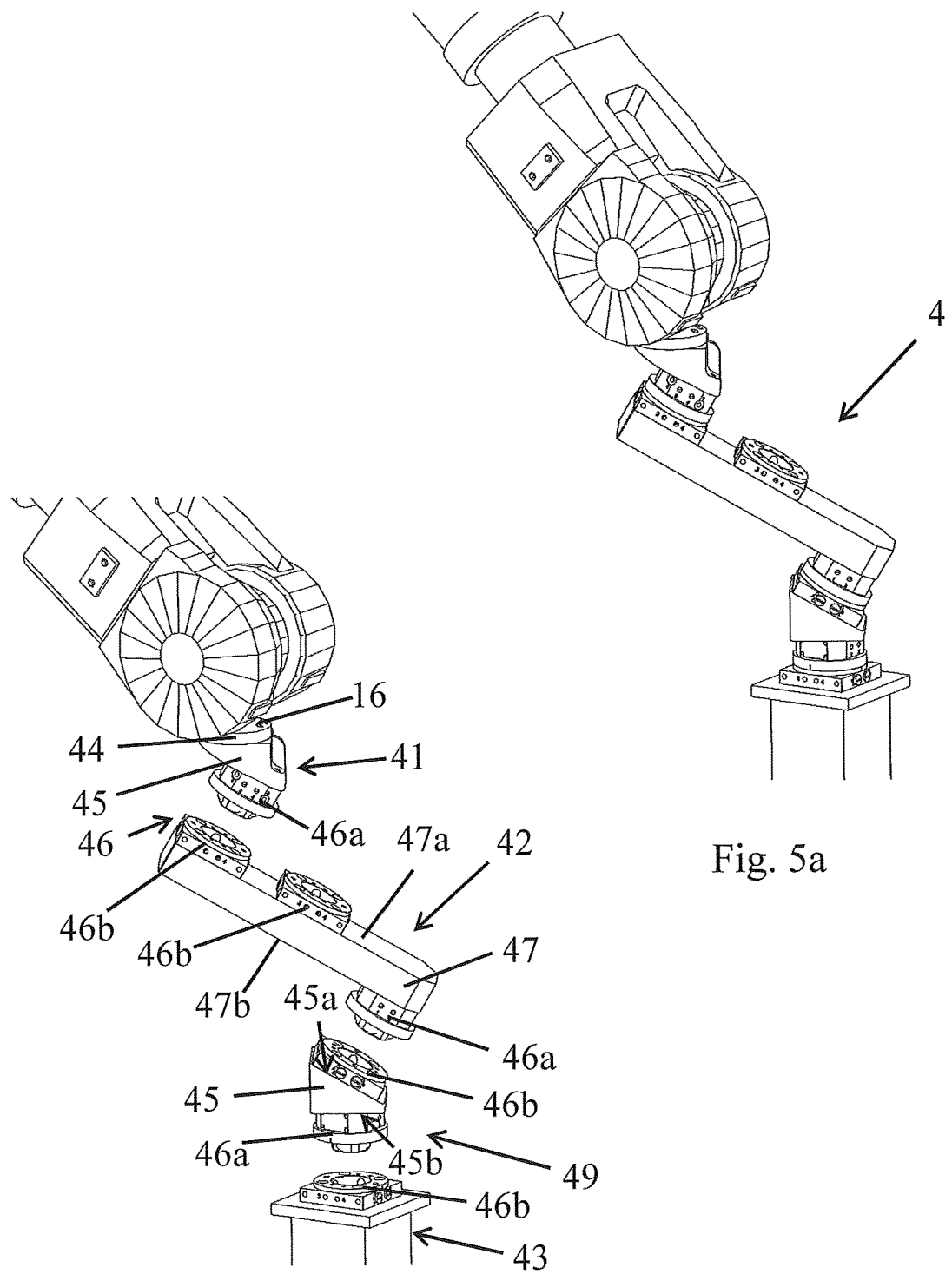

FIG. 5a illustrates another example of a constraining device 4, which is illustrated in an exploded view in FIG. 5b. The constraining device 4 in FIG. 5b is similar to the constraining device 4 in FIGS. 4a and 4b, but comprises an additional third constraining item 49. Except for the additional fourth constraining item 49, the parts of the constraining device 4 of FIG. 5b are the same as the constraining device 4 in FIG. 4b and reference is thus made to FIG. 4b and the thereto adhering text for explanation of these parts. The third constraining item 49 comprises a tool connector 46b, an angular offset item 45 and a tool changer 46a. The angular offset item 45 is arranged intermediate, or inbetween, the tool connector 46b and the tool changer 46a. Also in the third constraining item 49, the angular offset item 45 may be designed with two opposite non-parallel attachment sides 45a, 45b. The tool connector 46b is arranged to a first side 45a of the two opposite non-parallel attachment sides, and the tool changer 46a is arranged a second side 45b of the two opposite non-parallel attachment sides. The tool connector 46b of the third constraining item 49 is arranged to the tool changer 46a of the second constraining item 42, and the tool changer 46a of the third constraining item 49 is arranged to the tool connector 46b of the second constraining item 43. The angular offset item 45 defines an angle between its non-parallel attachment sides 45a, 45b that may be between 15°-45°, for example 30°. The angle may be constant between the planes, or varied, but must be known. The tool connector 46b defines one clamping point in an attachment plane of the tool connector 46b, and the tool changer 46a defines another clamping point in an attachment plane of the tool changer 46a. When the tool connector 46b and the tool changer 46a of the third constraining item 49 are assembled with the angular offset item 45, the attachment plane of the tool connector 46b and the attachment plane of the tool changer 46a are non-parallel. Thus, the third constraining item 49 comprises at least two clamping points whereof one clamping point in a first plane and another clamping point in a second plane where the first plane and the second plane are non-parallell. The angular offset item 45 is designed to have a comparable low weight (compared to the rest of the manipulator 2).

Thus, a constraining device 4 may comprise at least two clamping points whereof one clamping point in a first plane and another clamping point in a second plane where the first plane and the second plane are non-parallell. A plane may relate to an attachment plane of a tool exchanger, a tool changer or a tool connector. A plane may also relate to the plane of an attachment side of an angular offset item. As understood, various assemblages are possible to achieve a constraining device 4 comprising at least two clamping points whereof one clamping point in a first plane and another clamping point in a second plane where the first plane and the second plane are non-parallell.

Figure 6A:
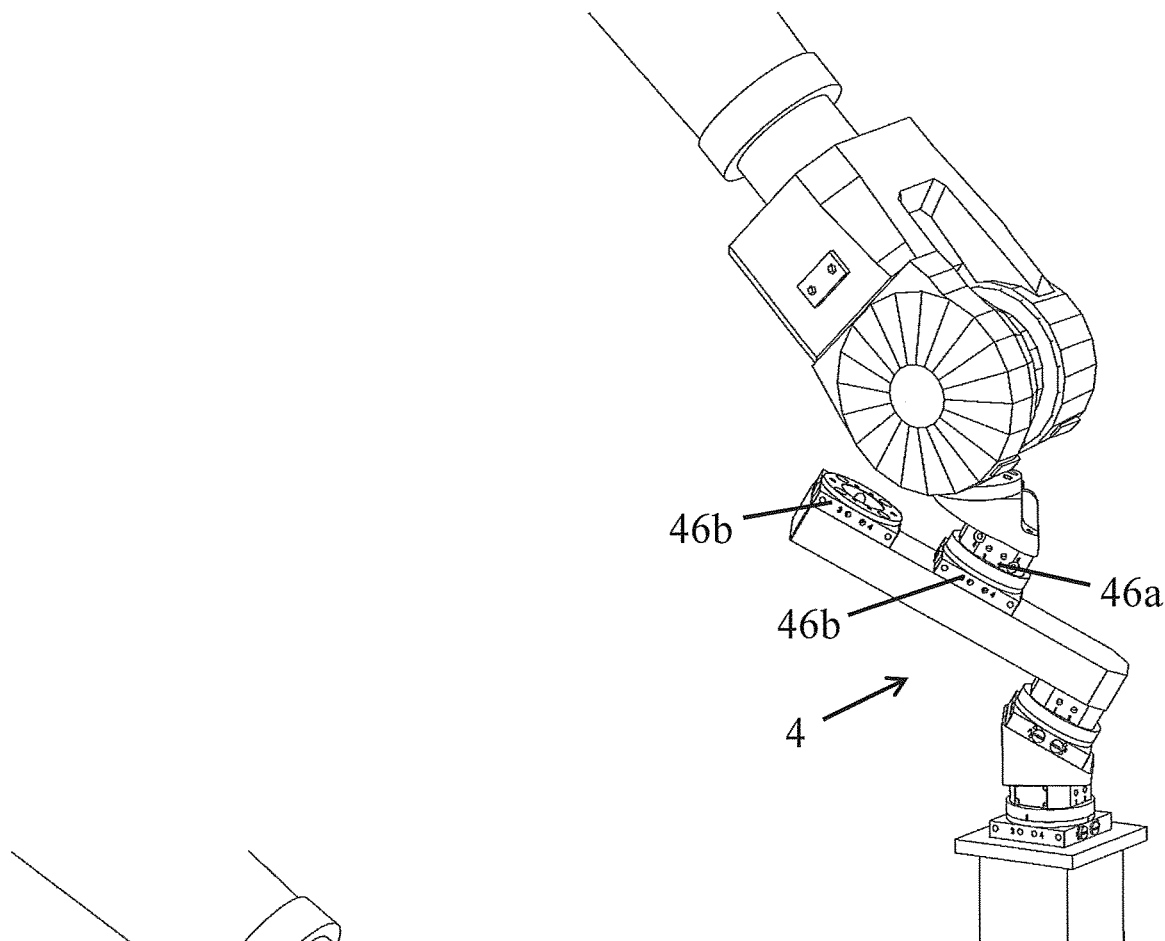
Figure 6B:
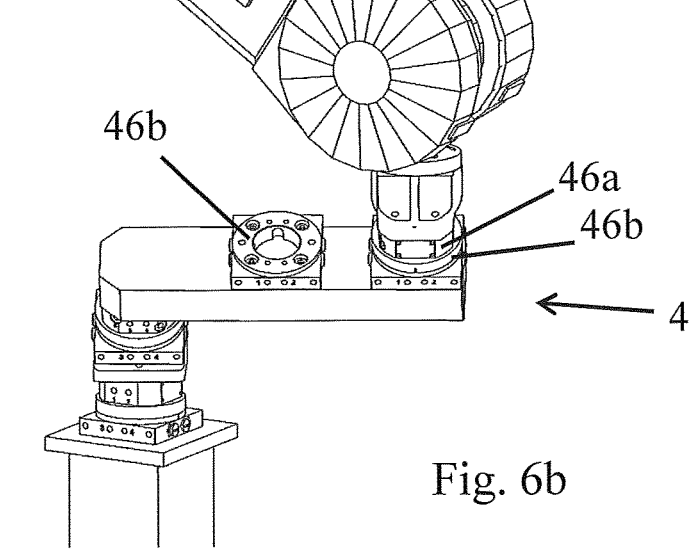

FIGS. 6a and 6b illustrates the constraining device 4 of FIGS. 5a and 5b in two different clamping points. The two different clamping points are defined by the two tool connectors 46b of the second constraining item 42; a distally located tool connector and a middle located tool connector. In FIG. 6a the tool changer 46a of the first constraining item 41 is attached to the middle located tool connector. In FIG. 6b the tool changer 46a of the first constraining item 41 is instead attached to the distal located tool connector.

Generally, an angular offset item 45, as anyone of these previously described, may be designed with two opposite non-parallel attachment sides 45a, 45b. The dimensions of the angular offset item 45 is preceisly known, such that it is know how much the last axis is off-setted. The angular offset item 45 may have shape of a wedge. The opposite non-parallell attachment sides 45a, 45b defines an intermediate angle between 15°-45°, for example 30°.

Generally, an elongated offset item 47 is designed with two elongated attachment sides 47a and 47b. The dimensions of the elongated offset item 47 is preceisly known. The elongated offset item 47 may have the shape of a cuboid. The two elongated attachment sides 47a and 47b may be parallel sides, e.g. parallel sides of a cuboid.

Each clamping position can be used multiple times by utilizing the fact that robots usually can reach a certain pose, with a certain position and orientation, with different configurations, i.e., with different joint angles. This feature is the same thing that makes the inverse kinematics a difficult problem; a classic example is the two solutions with either the elbow up or down. Depending on the type of robot, there may exist a different number of configurations for the same clamping point. For industrial robots with spherical wrists, it is generally possible to turn the fourth joint 180 degrees and mirror the fifth joint angle around the zero degree angle.

For robots with more than six joints, it is generally possible to move the robot arm while keeping the end-effector fixed, i.e., using a null-space motion. For a robot with seven joints this corresponds to the elbow motion, i.e., the same as for the human arm. Utilizing the null-space motion gives a large number of different measurement points for every clamping point.

The control system 3 (FIG. 1) comprising a processor 20 and a computer readable storage unit 21 with instructions configured to perform the method according to any of the embodiments as will be described herein. The processor 20 may include one or several central processing units (CPUs). The computer readable storage unit 21 may include one or several memory units. The processor 20 may also comprise an interpreter, with is implemented on a system level to provide a programming language to the end-user of the robot. The storage unit 21 then stores user programs, which are readable by the interpreter. Instead of an interpretor, the user programs can be compiled to some intermediate code or machine code for the CPUs. Depending on features of the control system 3, the method according to the present invention may be possible for the user to implement on a standard robot that is not prepared or instrumented in advance. In any case, the control system 3 is configured to control movement of the manipulator 2. Depending on preference, the control system 3 may be external in the form of a manually or automatically operated controller (or a digital computer) or internal, i.e. built-in into the manipulator 2 itself. The control system 3 may include a computer (not shown) for exchange of data such as CAD-data used by the controller for controlling the manipulator 2. The computer may also be a master of the controller, such that the controller acts as a slave to the computer and is controlled via the computer.

The manipulator 2 may comprise built-in sensors (not shown), such as encoders or resolvers attached to motor shafts or similar, to sense the actuator positions of the joints in order to sense an end-effector position in relation to an internal coordinate system that is spanning a joint space and to relate the end-effector position to an external coordinate system (usually spanning a Cartesian space). These sensors, normally used for the feedback control of the manipulator 2, can also according to the current invention be used to determine data that can be used to determine joint and link properties such as compliance, and geometric properties. Parameters such as motion speed, force, or stiffness can be transformed between the joint space and the Cartesian space. In a similar way, parameters describing the actuator space, such as joint motor angles driven by force or torque, can be translated into parameters describing the joint space, such as joint positions as known from kinematic calibration.

One way to achieve a kinematic chain for constrained motions is to let the control system 3 (either automatically or by manual commands) control the manipulator 2 such that a movable part of the manipulator 2, e.g. the tool exchanger 5, reaches a point in space where an attachment point of a constraining device 4 is located. In FIG. 2 this attachment point is the connecting link 51 of the Cardanic joint 17.

The manipulator 2 is further arranged to be controlled by the control system 3 for moving the end-effector of the manipulator 2 to target poses. At least one of the axis of the manipulator 2 includes compliance. The manipulator 2 is arranged to be constrained in at least one direction such that the motion of the manipulator 2 is constrained in at least one degree of freedom, thereby forming a physical constraint for the manipulator motion.

Representation of Rigid-Body Kinematics

The obtained geometric properties of the following method can be used for kinematic calibration of the manipulator 2. The control system 3 may then make use of a more complete model of the manipulator 2 where intersecting and parallel joints of the manipulator 2 deviate from the ideal case.

As an alternative to a solution with calibrated values for each (by the control system 3 on system level) interpolated pose along a path, the calibrated values can be used for obtaining adjustments of the programmed poses only. When interpolated intermediate poses then diverge more than acceptable, the robot programmer has to insert more programmed poses. This alternative is common in industrial systems since the computational demands are lower and other error sources such as non-linear transmission effects are commonly ignored anyhow. In the following it is not stated if compensation based on calibrated values of known errors is being considered for programmed poses only, or if intermediate interpolated poses on the (real-time) system level are compensated since the following principles apply in both cases.

The rigid body kinematic model for a kinematic chain can be represented in many ways. A common alternative is to use Denavit-Hartenberg (DH) parameters to specify the chain and to use homogenous transforms or Euler angles for the involved computations. Although it is possible to use the Denavit-Hartenberg parameters within the following method, it is advisable to use a formalism that avoids numerical problems/singularities for slightly misaligned geometries, and that extends to the situation when elastic degrees of freedom are added.

One such formalism, and the preferred one as used here, is based on screw theory as described in "A mathematical introduction to robotic manipulation" by Murray et al published in 1994. The benefit of using screw theory is that the representation is singularity-free and that it covers both motion description and force interaction for rigid bodies. Using screw theory, a robot is described by a number of twists, $\{\xi_i\}_{i=1\ldots n}$, where n is the number of joints. Each twist $\xi_i$ is associated with a joint and describes how the joint moves the robot. In the case of a revolute joint, the twist $\xi_i$ describing joint i is given by $$\xi_i = \begin{bmatrix} -\omega_i \times p_i \\ \omega_i \end{bmatrix} \quad (1)$$

where $\omega_i$ is the axis of rotation for the joint and $p_i$ is a point on the axis of rotation. The kinematics of a robot can be described by a number of kinematic parameters, $x_{kin}$, which in the case of screw theory is a set $\{\{\omega_i, p_i\}_{i=1\ldots n}, g_0\}$, where $g_0$ denotes the homogenous transformation matrix of the robot in its home position (when all joint angles are zero). As an example, the kinematic parameters for the robot depicted in FIG. 1 is given by $$p = \left\{ \begin{bmatrix} 0 \\ 0 \\ 0 \end{bmatrix}, \begin{bmatrix} 0.1 \\ 0 \\ 0.615 \end{bmatrix}, \begin{bmatrix} 0.1 \\ 0 \\ 1.32 \end{bmatrix}, \begin{bmatrix} 0.1 \\ 0 \\ 1.455 \end{bmatrix}, \begin{bmatrix} 0.855 \\ 0 \\ 1.455 \end{bmatrix}, \begin{bmatrix} 0.855 \\ 0 \\ 1.455 \end{bmatrix} \right\}$$

$$\omega = \left\{ \begin{bmatrix} 0 \\ 0 \\ 1 \end{bmatrix}, \begin{bmatrix} 0 \\ 1 \\ 0 \end{bmatrix}, \begin{bmatrix} 0 \\ 1 \\ 0 \end{bmatrix}, \begin{bmatrix} 1 \\ 0 \\ 0 \end{bmatrix}, \begin{bmatrix} 0 \\ 1 \\ 0 \end{bmatrix}, \begin{bmatrix} 1 \\ 0 \\ 0 \end{bmatrix} \right\}, \quad g_0 = \begin{bmatrix} 0 & 0 & 1 & 0.94 \\ 0 & 1 & 0 & 0 \\ -1 & 0 & 0 & 1.455 \\ 0 & 0 & 0 & 1 \end{bmatrix}$$

where the length unit in p and $g_0$ is meters. The forward kinematics, $f(q, x_{kin})$, using screw theory is given by the product of exponentials formula $$f(q, x_{kin}) = \prod_{i=1}^{n} e^{\hat{\xi}_i q_i} g_0 \quad (2)$$

where $q_i$ denotes the joint angle of joint i, and $\hat{\xi}_i$ is given by $$\hat{\xi}_i = \begin{bmatrix} \hat{\omega}_i & v_i \\ 0_{1\times 3} & 0 \end{bmatrix} \quad (3)$$

where $v_i$ represents the first three values of the twist $\xi_i$, i.e., $v_i = -\omega_i \times p_i$ if the joint is revolute, and $\hat{\omega}_i$ is given as $$\hat{\omega}_i = \begin{bmatrix} 0 & -\omega_{i,3} & \omega_{i,2} \\ \omega_{i,3} & 0 & -\omega_{i,1} \\ -\omega_{i,2} & \omega_{i,1} & 0 \end{bmatrix} \quad (4)$$

where $\omega_{i,j}$ denotes element j of $\omega_i$.

The kinematic parameters, $x_{kin}$, of the kinematic model consists of geometric properties of the manipulator 2, for instance in the form of twists. The kinematic parameters may also include parameters such as motor offsets. The forward kinematics of the manipulator 2 is used to calculate the position and orientation of the end-effector given the joint angles, q, and the kinematic parameters, $x_{kin}$. The forward kinematics is usually expressed as a homogenous transformation matrix according to $$f(q, x_{kin}) = \begin{bmatrix} R & p \\ 0_{1\times 3} & 1 \end{bmatrix} \quad (5)$$

where $R=R(q,x_{kin})$ is a rotation matrix describing the orientation of the end-effector, and $p=p(q, x_{kin})$ is the Cartesian position of the end-effector, which is given as $$p = \begin{bmatrix} x_{ee} \\ y_{ee} \\ z_{ee} \end{bmatrix} \quad (6)$$

Representation of Non-Geometric Properties

WO2014065744 deals with determining the non-geometric properties of joints, and WO2015030650 deals with the non-geometric properties of links. Both these assume some kind of constrained motion, described as clamping since a practical solution is to dock the end-flange to a fixed point in space such that the manipulator 2 cannot move except for small motor movements due to the presence of non-geometric effects such as elasticity in joints and links. The clamping can also be accomplished by constraining only in 1DOF, if the manipulator 2 can move to poses that in total cover the excitation of all joints and all links, in both directions.

A principle here is to use the internal sensors of the manipulator 2, and optionally external ones, and also to actively use the internal motor torques to accomplish optimal conditions for determining the properties. The maximum freedom of constrained motion then is to constrain only 1DOF. This is the most practical configuration, and therefore the only one described here, but clearly more restrictive mechanical constraints can also be used as long as motion is permitted at some time for all joints and links of interest for improving accuracy of the manipulator 2.

The constraints for clamping according to the WO2014065744 and the WO2015030650 can then be accomplished by selecting appropriate target poses that permits a pull/push load on the bar 18 (FIGS. 1-2) to be projected onto the axis and axes that are subject to identification for determining their properties, and then to select a sufficient large set of target poses such that all non-geometric properties can be determined.

The WO2014065744 principle means that by measuring only motor signals, models of the transmissions including parameters capturing individual variations can be maintained, and that model can then be used to compute the joint angle and torque on the link side of each transmission. There are situations when that computation does not give a reliable result due to the identified non-linearitites (such as backlash) not being invertible. In an industrial application also identified non-linearities such as backlash being non-invertible can be determined in CAM (Computer Aided Manufacturing) software tools and the configuration be changed accordingly, and correspondingly in the following data obtained in such non-invertible load cases can be omitted since numerous good load cases can be created easily by exploring the workspace of the manipulator 2.

The WO2015030650 principle means that lack of stiffness in the links, including orthogonal joint compliance and non-linear compliance, can be determined and then compensated for from a kinematic point of view. That is, instead of the 5DOF fixed transformation from one joint to the next over the link in between, those DOF can be considered elastic. Additionally, the elasticity of each joint transmission adds another DOF, so in principle each manipulator DOF in terms of standard rigid body kinematics is accompanied by 6DOF non-actuated elastic DOF. Normally, some of those elastic DOF can be considered being stiff, and hence not included. The link-length stiffness is one such elasticity that can be omitted. For easier understanding of the method described below, the representation of the non-geometric properties will now be explained in more detail.

The stiffness model from WO2015030650 is the basis for the model used, i.e., with component stiffness relations as described in Eqs. (1)-(6) therein. The model of the joint, Eqs. (5)-(6) in WO2015030650, has been updated to even better represent the behavior of a joint of the manipulator with a servo motor. The new model is based on adding transmission compliance for each joint, illustrated in a 1D example in FIG. 9a. In the example, there are two links with a joint in between connecting them. The degrees of freedom for this system is illustrated as the numbered markings, B1 to B5. Each link has two degrees of freedom, denoting the deformation of each end of the link, i.e., the first link is associated with the degrees of freedom denoted B1 and B2, and the second link with the degrees of freedom denoted B4 and B5. The joint is modeled to be the connection between the degrees of freedoms denoted B2 and B4. The motor of the joint applies a torque (force) between B2 and B3, and the the rest of the transmission in the joint is represented as the spring with the stiffness k between B3 and B4. The joint thus has an own degree of freedom, the one denoted B3. If the torque from the motor is denoted $\tau$, the stiffness of the transmission in the joint k, and the deformations corresponding to the numbered degrees of freedoms in FIG. 9a as $u_i$ where i is the number of the degree of freedom, the component stiffness relation for the joint is given by $$\hat{F} = \begin{bmatrix} -\tau \\ \tau \\ 0 \end{bmatrix} + \begin{bmatrix} 0 & 0 & 0 \\ 0 & k & -k \\ 0 & -k & k \end{bmatrix} \begin{bmatrix} u_2 \\ u_3 \\ u_4 \end{bmatrix} \quad (7)$$

Figure 10:
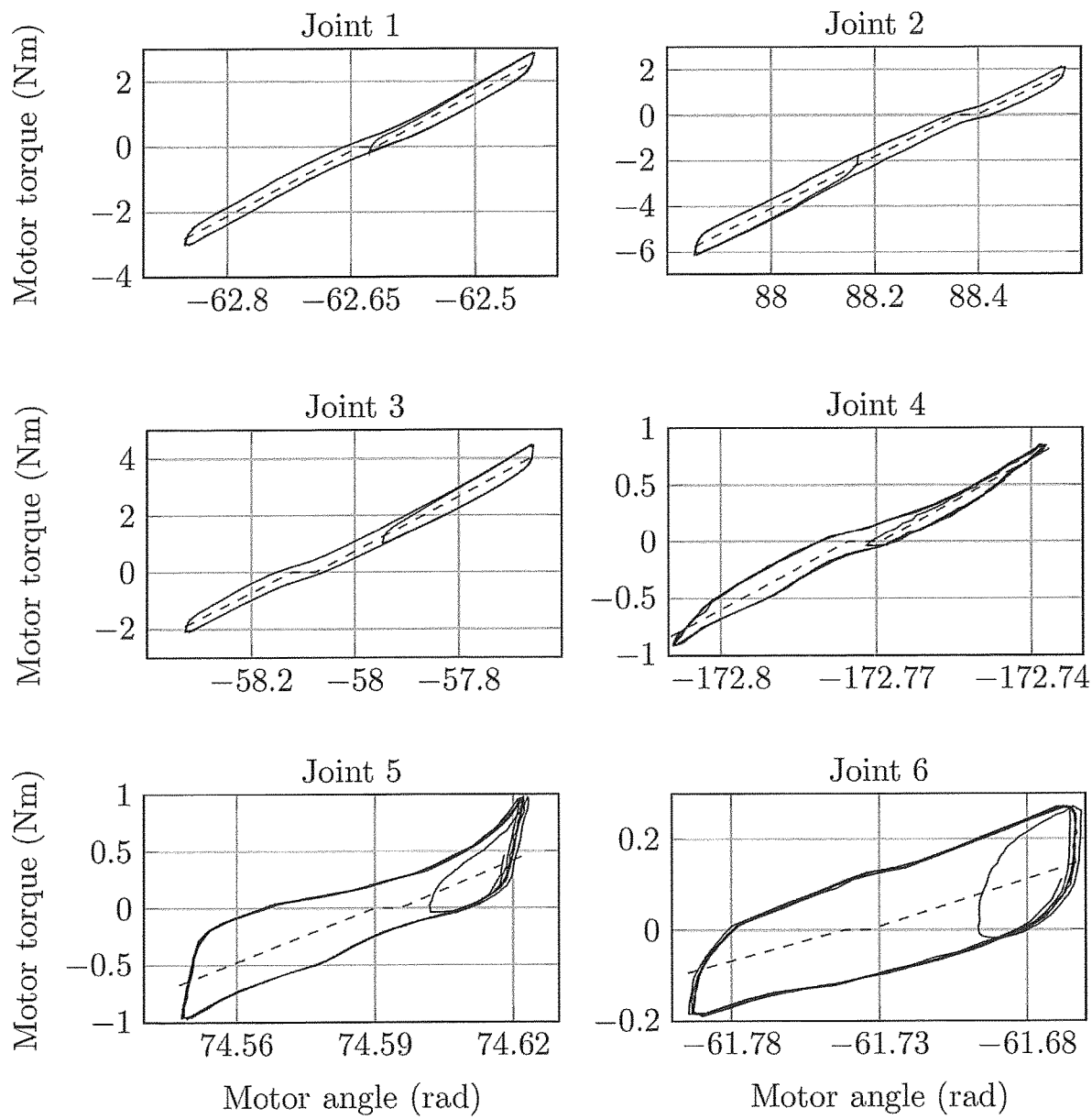
FIG. 10 presents monitored motor signals obtained from a physical clamping experiment, using the robot depicted in FIG. 1, providing data as needed for Eq. 15.

A 2D example with two links and one joint is illustrated in FIG. 9b. A corresponding example is illustrated in FIG. 10 in WO2015030650, but with a simplified joint model assuming the motor torques being applied directly, i.e., without the transmission model of WO2014065744 that when applied here (from a compliance point of view) adds an extra degree of freedom. The position of the joint is modeled to be the same as the ends of the two connecting links. The orientation can, however, be different on each side of the joint, where $\theta_1$ is the deformation angle of link 0 and $\varphi_1$ is the deformation angle of link 1. The extra degree of freedom of the joint is denoted $\beta_1$, and it connects to $\theta_1$ via the torque $\tau$, and the connection from $\beta_1$ to $\varphi_i$ is through the transmission stiffness which is illustrated as the spring with stiffness k. The 2D joint model becomes exactly the same as in Eq. (7), if $u_2$ denotes $\varphi_1$, $u_3$ denotes $\beta_1$, and $u_3$ denotes $\theta_1$. Eq. (7) thus is the new version of Eq. (6) in WO2015030650. The structure of the global stiffness matrix for the 2D example illustrated in FIG. 9b is displayed in FIG. 9c, which is the new version of FIG. 11a in WO2015030650, now reflecting the updated relation between the motor torque and the transmission stiffness.

When the global stiffness matrix is assembled the component stiffness models are transformed to the same coordinate system. For the new joint model, the same applies to the 1D and the 2D case. In the 3D case, however, it becomes difficult to add the extra degree of freedom in each joint using this method, as the extra degree of freedom in general does not coincide with one of the coordinate axes. Instead of using the global coordinate system for each link, the local link coordinate systems are used in the global stiffness matrix. The link ends that are connected by a joint must, however, be described in the same coordinate system to be able to connect them in the global stiffness matrix. This can be handled by using the transformation (10) in WO2015030650 with the transformation for link i, $L_i$, defined as $$L_i = \begin{bmatrix} R_{i-1,i} & 0 & 0 & 0 \\ 0 & R_{i-1,i} & 0 & 0 \\ 0 & 0 & I & 0 \\ 0 & 0 & 0 & I \end{bmatrix} \tag{8}$$

where $R_{i-1,i}$ is the rotation matrix describing the reorientation from the coordinate frame of link i−1 to the coordinate frame of link i, I denotes the 3×3 identity matrix, and the zeros represent zero matrices of size 3×3. The two rotation matrices in the upper left corner of $L_i$ transform the component stiffness matrix such that the force/torque vector (3 forces and 3 torques) acting in the first end of the link is expressed in the same coordinate system as the force/torque vector acting on the second end of the previous link, which mean that the force/torque vector acting on the second end of the link should thus not be transformed and these entries therefore have identity matrices. The same reasoning is valid for the deformations at the ends of each link as well.

The model for the system takes the form $$Ku=F \tag{9}$$

as in WO2015030650. The unknown parameters consists of $n_\alpha$ stiffness parameters in K, where $n_\alpha$ is the elastic DOFs, and $n_u$ deformation parameters in u, where $n_u$ is equal to the number of elements in u. The stiffness parameters may be nonlinear functions of the applied torque in the motors, $\tau$, where each stiffness parameter $k_i$ can be modeled as an expansion in a set of basis functions as $$k_i = k_i(\tau) = \sum_{j=0}^{n_k} k_{i,j} \varphi_j(\tau) \tag{10}$$

where $\{\varphi_j(\tau)\}_{j=1\ldots n_k}$ is a suitable set of basis functions, e.g., polynomials, $n_k$ is the number of terms in the expansion, and $\{k_{i,j}\}_{j=1\ldots n_k}$ are parameters. The total number of stiffness parameters are thus $n_\alpha n_k$. The constraining of the motion of the manipulator 2, i.e. here clamping, fixes the position and orientation of the first and the last link, i.e., the deformation parameters of the clamped ends become zero. The total number of unknowns is therefore $n_\alpha n_k + n_u - 6$ in the 2D case and $n_\alpha n_k + n_u - 12$ in the 3D case. As no parameters in either K or u are known, there exists an unknown scaling, as if K and u fulfills Ku=F, also $\alpha K$ and $\alpha^{-1} u$ for $\alpha \neq 0$ fulfills the relation. To overcome the scaling problem, extra equations can be added. The joint angles, q, are related to the motor angles, $\theta_q$, through $$\theta_q = \beta + N q \tag{11}$$

where N is the gear ratio matrix for the robot, and $\beta$ denotes the extra degrees freedom representing the joint stiffnesses, i.e., $\beta_i = \tau_i / k_i$ where $k_i$ is the stiffness of joint i and $\tau_i$ is the torque exerted by the motor in joint i. The fact that the manipulator 2 is clamped means that the (elastic) forward kinematics of the manipulator 2 for a loaded configuration must give the same position and orientation as for an unloaded configuration (a configuration with zero deformation), this relation can be expressed as $$f(q,u) = f(q_z, 0) \tag{12}$$

where $f(\cdot,\cdot)$ gives the forward kinematics of the robot, and $q_z$ denotes the joint angles in the unloaded case (zero torque). In all practical situations, the deformations will be small in relation to the size of the manipulator 2, which admits a linear approximation of the above relation. The deviation from the position and orientation in the unloaded case can then be written as $$J_u u + J \delta q = 0 \tag{13}$$

where J denotes the geometric Jacobian of the robot, $J_u$ the geometric Jacobian with respect to the deformations, and $\delta q = q - q_z$. The Jacobians will be functions of both q and u, but as the deformations are small, the approximations $J \approx J(q_z, 0)$ and $J_u \approx J_u(q_z, 0)$ are valid, i.e., the changes of the Jacobians due to the deformations are neglectable. These new equations can be used to extend the original model (Ku=F) according to $$\underbrace{\begin{bmatrix} K & 0 \\ P & N \\ J_u & J \end{bmatrix}}_{K_{ext}} \begin{bmatrix} u \\ q \end{bmatrix} = \begin{bmatrix} F \\ \theta_q \\ J q_z \end{bmatrix} \tag{14}$$

where P is a selection matrix such that $Pu = \beta$. This new set of equations do not have the scaling problem, as parts of the extended stiffness matrix, $K_{ext}$, now consists of known parameters.

Method

Figure 8:
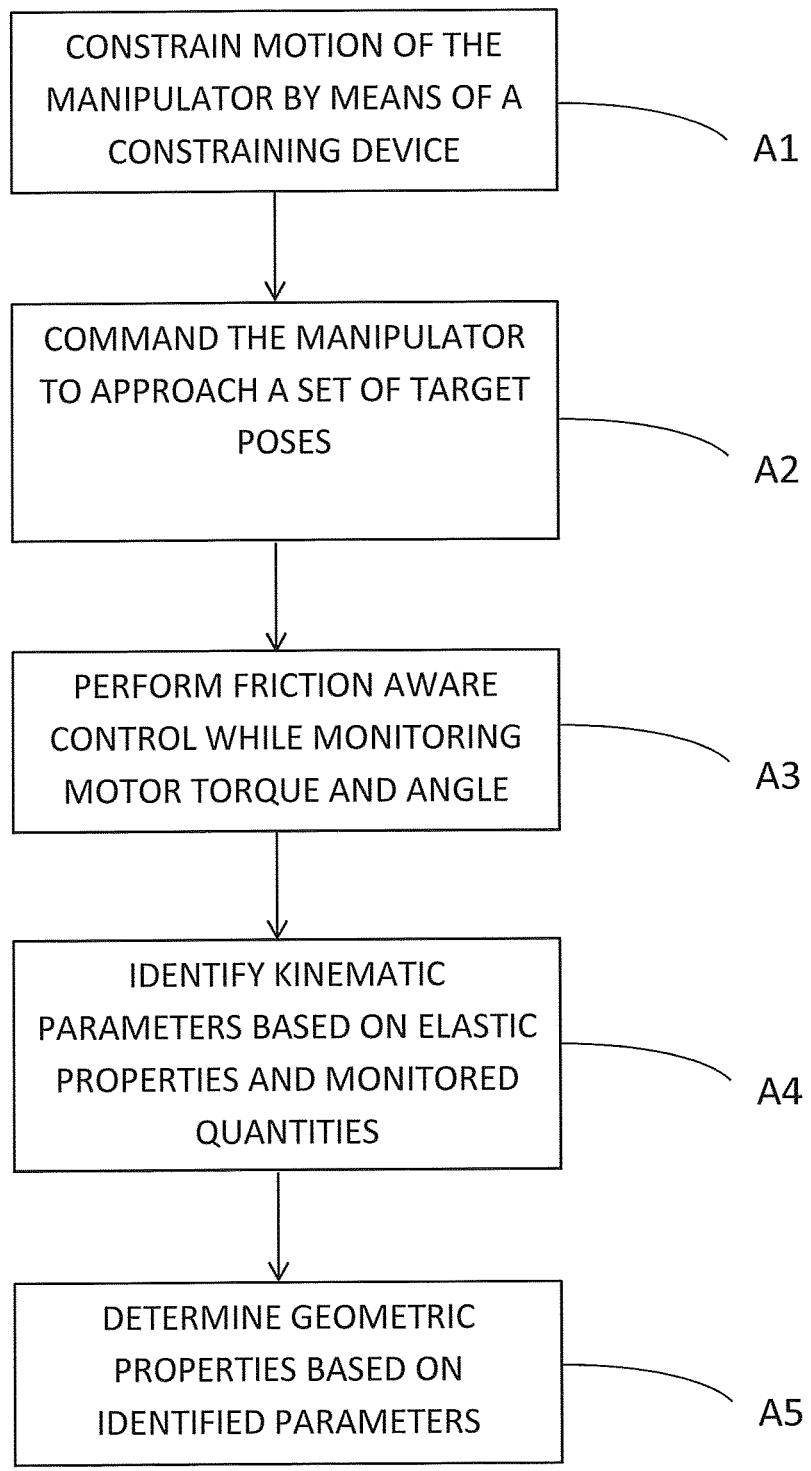
FIG. 8 outlines the involved steps of the method, which can be iteratively applied as a whole, and in which steps A2 and A3 may include iterations and a plurality of poses.

In the following a method for determining at least one geometric property of a manipulator that influences end-effector motions of a manipulator, e.g. the manipulator 2 included in the industrial robot 1 illustrated in FIG. 1, will be explained. The method may be used manually by operator commands to the robot 1, or it may be implemented as a computer program including computer instructions or as a robot program including robot language instructions, and be automatically performed by the industrial robot 1, when the program is executed by the processor 20 of the control system 3. The control system 3 may thus perform one, several or all steps of the method automatically. The method is here explained mainly with reference to a manipulator comprising at least two axes, but is should be understood that the manipulator may comprise more axes for which geometric properties are determined, e.g. three, four, five, six or seven axes. Further, more than one axis, e.g. a plurality of axes, may comprises at least one elasticity. Further, more than one, i.e. a plurality, of geometric properties may be determined by the method. The method will now be explained with reference to the flowchart in FIG. 8 and to the illustrating FIGS. 9a-9c and 10.

The method includes the step A1 of constraining motion of the manipulator 2 by means of a constraining device 4 such that the motion of the manipulator 2 is physically constrained in at least one degree of freedom, and thereby enable a constrained manipulator motion and correspondingly a constrained motor motion for the at least one axis. With constrained manipulator motion is here meant that the motion of the manipulator is constrained in a predefined manner by the constraining device 4. By a constrained motor motion is meant that as the manipulator motion is constrained, and thereby the motor motion becomes correspondingly constrained via the manipulator kinematics.

According to one embodiment, the motion or motions of the manipulator 2 refers to the end-effector or end-flange motion of the manipulator 2, preferably via a tool-exchanger. In other words, the manipulator motion may refer to motion of an end-effector mounted via a tool-exchanger onto an end-flange of the manipulator 2. The end-effector properties are previously known, or determined by other means. The motion of the manipulator 2 is constrained by connecting a link of the manipulator to the constraining device 4. The constraining motion of the manipulator 2 thus comprises docking the manipulator 2 to the constraining device 4, that provides the mechanical interface for the manipulator 2, thus as of the tool exchanger. Thereby no addition or modification of the manipulator or its end-effector is required.

When determining geometric properties, such as exact link lengths or the parallellity of two joints, the manipulator 2 has to be able to move, or else the errors would not be visible, at least not when no accurate fix-points are known in the environment as is the case here for reasons of applicability. Still, according to the present invention, the end-effector motion should at least locally be mechanically constrained since that provides means to control the load of the manipulator 2 and its components. According to some embodiments, the motion of the manipulator 2 is constrained by connecting a link of the manipulator 2 to the constraining device 4, for example any of the previously described constraining devices 4. The constraining device 4 may include the double-ball-bar mechanism 4 as illustrated in FIGS. 1-2, or a constraining device 4 as illustrated in FIGS. 3-6. The double-ball-bar mechanism 4 may be used for constraining motion of the manipulator 2 such that all quantities for determining joint properties, link properties and geometric properties can be monitored and thus obtained. However as a complement, for determining quantities related to motor torque and to motor and/or joint angles of the manipulator 2 to be used for determining properties of joints and links, the motion of the manipulator 2 may be constrained by connecting the tool-exchanger 5 of the manipulator 2 to a constraining device 4 being a clamping device constraining the motion of the end-effector in all DOF. The clamping device may be a different constraining device 4 than the one depicted in FIGS. 1-6. It may instead be a clamping device as illustrated in WO2014065744 or WO2015030650, thus, a clamping device with a plurality of parallel links that can be locked after attaching the tool-exchanger 5 to the clamping device to provide a stiff clamping. Different constraining devices may be used in combination for different types of parameters, even for a single robot.

According to some embodiments, the constraining motion A1 of the manipulator comprises clamping the manipulator to at least one clamping point, where the position and/or orientation of the at least one clamping point may be unknown.

According to some embodiments, the constraining motion A1 of the manipulator comprises clamping the manipulator to a plurality of different clamping points, where the positions and orientations of the clamping points may be unknown but the relative transformation between the clamping points is known. For example, a constraining device 4 comprising a constraining item 42 including an elongated offset item 47 as has been previously explained may be used for clamping the manipulator 2 to the clamping points of the constraining item 42. Further, a tool exchanger 46 may be used for reorientation of the manipulator 2 to other clamping points.

According to some embodiments, the constraning motion A1 of the manipulator comprises offsetting a tool exchanger arranged to the manipulator such that the rotation axis of the tool exchanger is non-parallell with the rotation axis of the link of the manipulator that the tool exchanger is attached to. For example, a constraining device 4 comprising a tool exchanger assembly 41 and/or a constraining item 43, including an angular offset item 45, as has been previously explained may be used.

When the motion has been constrained, the method includes the step A2 of commanding A2 the manipulator to approach a set of target poses where for each target pose a physical pose is reached in which the constrained manipulator motion can be performed, which includes a non-zero constrained motor motion. According to one embodiment, the set of target poses includes a plurality of different orientations and positions of the end-effector. For determing suitable target poses, a plurality of candidate poses that should be reachable in case of no kinematic errors of the manipulator 2, may first be generated or defined. Then reachable poses of the candidate poses are selected as target poses, and arranged in a target pose list that can be used for sequencing motions towards the target poses. Paths between the target poses are then defined and planned or generated between the target poses of the target pose list, such that the manipulator 2 may automatically move between the target poses.

One practical aspect is the load on the clamping point, for instance due to gravitation, in particular in combination with the elongated offset item 47 resulting in a rather high torque around the tool exchanger 46, thereby risking an unmodeled deviation. Similar if a milling tool is used for clamping of a heavy manipulator such that balancing the gravitational forces means an overload on the end-effector and thereby a risk for damage. In such cases the normal clamping around zero motor torque can be modified to be around a torque that correspond the the gravity, thereby permitting rather small and inexpensive clamping items for comparably large robots (i.e. robots above 150 kg payload). This uses the third alternative for friction-aware control mentioned earlier.

In case of the embodiments according to FIGS. 3-6, the motions between clamping poses are less constrained and simply defined by the mechanics. Each tool exchanger 45 can be locked in at least four and up to twelve different rotational angles. Even arbitrary many rotations can be achieved by using a special locking mechanism, but additional sensing will be required if different rotations are too close to each other.

The manipulator 2 is then caused to move along the paths of the target pose list while the quantities related to at least one motor torque and to motor angles of the manipulator 2 are monitored. These quantities are typically motor torque and motor position for all axes. Before all parameters are identified, to keep interaction forces withing acceptable limits, the constrained motion may involve compliant control of one or several of the joints of the manipulator 2. Equivalently, force controlled motions can be used. The constraining device 4 can also comprise elements with adjustable stiffness, such that softer constraints are used initially when deviations are more significant.

The target poses may be different depending on if they should be used when monitoring quantities indended for determining joint properties, link properties or geometric properties. For example, for determining geometric properties, some motion should be possible, either via the constraining device 4 or by utilizing a null-space of one or several arms that in total have DOF larger than 6. The constraining mechanism may be used in combination with peripheral devices such as track motions, servo-controlled end-effectors, and external axes for positioning the workpiece. According to one embodiment, the at least one geometric property is related to a peripheral device (not shown) of the manipulator 2. The peripheral device then comprising at least one link that is influenced by the motion of the manipulator 2.

One advantage (compared to the ball-bar) with the multiple-fixed clamping according to FIGS. 3-6 is that each clamping pose can be used for determining both the non-geometric and the geometric properties. A disadvantage is that geometric errors may be less exposed, and thereby harder to identify accurately, than when using the ball-bar reaching a larger part of the workspace. (An overly long offset item gets hard to hande by the robot wrist.) Therefore, according to one embodiment, it is suggested that the ball-bar embodiment is used with production of AbsAcc robots, while clamping devices like those in FIGS. 3-6 for the multiple fix point clamping are more suitable for limited calibration (for example of motor offsets only) and for recalibration after repair.

When the motion has been constrained and motions near each desired target pose has been performed, the method includes the step A3 with control of the at least one joint. Step A3 comprises to perform friction-aware control of the constrained manipulator motion for a period of time while monitoring quantities related to motor torque and to motor angle of the at least one axis. With friction-aware control is meant adapting the control of the constrained manipulator motion to manipulator properties such that friction can be identified and handled. By establishing and finding unloaded conditions of the manipulator 2, data for identification of the geometric properties can be retreived. In general terms, the purpose of the friction-aware control is to accomplish well-defined friction forces/torques that can be separated from the effects that are explicitly managed. Reference is here made to the previously explained first, second and third alternatives for accomplish well-defined friction forces/torques.

With a period of time is here meant a time period with a length that suffice for retrieval of the desired quantities. For a manipulator with high-quality mechanics, motors with very low torque ripple, and motor angle sensors with very low noise, a monitoring once with a few data points obtained over a second could be sufficient. For manipulators with varius (known or to be determined) deficiencies, a suitable time period may be selected, possibly after study of the monitored data.

According to some embodiments, the method comprises performing friction-aware control A3 by controlling the at least one axis in a reciprocal motion encompassing backlash of the at least one axis. The backlash may thus be identified, and a midpoint or endpoint of the backlash can be established from where the manipulator can start its motion. The effect of the backlash may thus be separated from the rigid body parameters, such that true geometric properties may be determined. The backlash is here considered to be a non-geometric property. On contrary, some manufacturers of low-cost robots may include the backlash in the set of geometric parameters. For standard robots it is expected that the backlash, or position hysteresis such as lost motion in general, is taken care of in the motion planning and/or in the motion control. With encompassing backlash is meant including data of the backlash such that backlash can be identified.

According to some embodiments, the method comprises commanding A2 the manipulator to approach the set of target poses where for each target pose a physical pose is reached in which the constrained manipulator motion can be performed, due to the existence of at least one unconstrained direction of the constrained manipulator motion. Further, the method comprises performing friction-aware control A3 by controlling the at least one axis such that fully developed friction is accomplished. With an embodiment according to FIG. 1 this means that all axes should move such that the friction is fully developed for a non-zero motion, and hence the friction is well defined and possible to treat such that the geometric properties are accurately identified. With an embodiment according to any of FIGS. 3-6 the constrained motion is permitted due to elastic effects, and the friction-aware control positions each axis such that the stand-still unknown friction force gets no net effect on the motion from a geometry identification point of view. This typically using reducing servo feedback gain such that quantization effects (due to limited resolution in sensing, actuation and control) are avoided.

According to some other embodiments, the method comprises commanding A2 the manipulator to approach the set of target poses where for each target pose a physical pose is reached, in which the constrained manipulator motion can be performed due to the at least one elasticity effecting the at least one axis. Further, the method comprises performing friction-aware control A3 by controlling the at least one axis in a reciprocal motion encompassing a mid-point corresponding to a middle of any (possibly non-zero) backlash while disregarding friction effects. That is, the same mid-point is obtained as if there would be no friction. In other words, the friction-aware control is performed by controlling the at least one axis in a reciprocal motion encompassing a mid-point corresponding to a middle of any (possibly non-zero) backlash, while disregarding friction effects, that the at least one axis is controlled to reach, where the mid-point corresponds to a position that would result from the at least one axis having no friction, no backlash, no lost motion, and no driving torque. That is, if there is a backlash in the transmission of the at least one axis, the standstill position will be in the middle of that backlash. Correspondingly, in case of lost motion due to non-linear stiffness, the position corresponding to the unloaded mid-point would result from the friction-aware control. In more complex cases with non-linear stiffness, backlash, and friction distributed over the trive-train of the at least one axis, the friction-aware control (as can be tuned with knowledge about the machine elements) may include sequencing towards stepwise smaller torques and positioning according to the total backlash rather than that of the backlash experienced around zero torque. The variations are vaste, but the disclosed method is straightforward to apply. As mentioned, the purpose is to accomplish well-defined friction forces/torques. Reference is here made to the previously examplained second alternative to accomplish well-defined friction forces/torques. The friction-aware control should be tuned such that dynamic friction effects/transients that deteriorate the accuracy and condition for the identification is avoided. Friction-aware control is also useful for selecting a most suitable subset of axes to be used for determining certain properties, states of the control being used in that selection. With encompassing the mid-point is meant including data such that the mid-point corresponding to the zero friction state can be identified.

According to some embodiments, the method comprises commanding A2 the manipulator to approach the set of target poses where for each target pose a physical pose is reached, in which the constrained manipulator motion can be performed due to the at least one elasticity effecting the at least one axis, and performing friction-aware control A3 by controlling the at least one axis in a reciprocal motion encompassing a gravity-load-point, and such that the at least one axis reaches the gravity-load-point. The gravity-load-point (point referring to a point on the clamping hysteresis curve) corresponds to the position that would result from the at least one axis having no friction, no backlash, no lost motion, and a driving torque that balances the gravity forces. In practice there is the friction to cope with, and hence the friction-aware control must approach the gravity-load-point from a certain direction (with well defined friction while bringing the motion to a stop (e.g. zero speed), with approach from one direction without overshoot), which may require detuning the servo control for slower response. Again, the purpose is to accomplish well-defined friction forces/torques, but for this embodiment the benefit is that the load on the constraining device can be reduced, practically close to zero forces if all of the manipulator gravity forces are balanced out from the motor side. Hence the name gravity-load-point for the corresponding zero-friction point on the clamping curve. Obviously, also motion contraints and friction-aware control for other torques can be used, for instance while pushing the end-effector (or special devices, possibly including additional sensors) towards a known or measured surface. The skilled person can apply the disclosed method in a multitude of situations depending on the application at hand. Reference is here made to the previously examplained third alternative to accomplish well-defined friction forces/torques.

In the typical 6DOF case and for DOF larger than six, during fixed clamping or during a constrained motion such as the spherical one, the load case will be isostatic unless the kinematic chain is in a singular configuration. This forms the typical embodiment. On the other hand, according to one embodiment, at least one link is hyperstatically loaded, reflecting that at least one pair of links are involved in a singular configuration. Such a singularity is often considered a problem in robot applications, but for determining parameters it can be used as a motion constraint that eliminates the influence of a single joint transmission. In the hyperstatic case, computations of link forces is based on (14).

In the isostatic case, the generalized forces in any part of the manipulator can be computed from measured or known motor torques based on WO2015030650, and use the models from both WO2014065744 and WO2015030650 to calculate what deformations those forces will generate. By compensating the kinematical model based on the models of compliance, we will end up with a much more accurate kinematic model, which more specifically is an elasto-kinematic model. At each moment in time, at a certain load case over each link, the transformation from one joint to the next (considering the non-gemoteric effects) can be computed, simply by using the component stiffness matrix as described in WO2015030650. Thus, according to some embodiments the method comprises utilizing motor torques to determine at least one isostatic force that act on at least one link of the constrained axes.

Based on the obtained quatities, the method includes in a further step A4 to perform A4 an identification of a set of kinematic parameters for an elasto-kinematic model that includes at least one known quantity representing the at least one elasticity. The identification is based on the monitored quantities and on elastic properties of the manipulator 2. The elastic properties of the constraining device 4 may be known, either from earlier usage according to the disclosed method with those properties being identified, or by any standard (no clamped, using extra instruments) setup by the skilled person. Thereby a force/torque-dependent geometry is defined that can be managed by the method.

The identification problem is to find the kinematic parameters, $x_{kin}$, based on the measured joint angles, either as captured from a constrained null-space motion or compliant motor motion in clamping points. The principle is that the forward kinematics of the robot should be the same as the (unknown) clamping point(s), in addition to any extra hardware (e.g. offset items and tool exchangers) that might be present. According to some embodiments, this can be expressed as the following relation of homogeneous transformation matrices:

$$T_{FK}(q,x_{kin})=T_{clamp}(x_{cp})\,T_{extra}(p) \quad (15)$$

where $T_{FK}(q,x_{kin})$ denotes the robot forward kinematics as a function of the joint angles q and the kinematic parameters $x_{kin}$, $T_{clamp}(x_{cp})$ denotes the clamping point as a function a of $x_{cp}$, which is a compact representation of the clamping point as a six parameter vector, and $T_{extra}(p)$ denotes the known transformation due to extra hardware, possibly as a function of known parameters p. In the case of a known clamping point, only $x_{kin}$ needs to be identified, but in the case of unknown clamping point, also $x_{cp}$ needs to be identified.

$$\text{Let } f(T_1,T_2) = \begin{cases} p_1 - p_2 \\ \log(R_1 R_2^T)^\vee \end{cases} \quad (16)$$

where $p_i$ and denotes the position part of $T_i$, and $R_i$ denotes the rotation matrix part of $T_i$. Taking the logarithm and applying the V-operator of $R_1 R_2^T$ gives a three parameter representation of the orientation error between $T_1$ and $T_2$. The function f can be used to setup the following cost function:

$$J_{cost}=\Sigma_{i=1}^{N}\|f(T_{FK}(q_i,x_{kin}),T_{clamp}(x_{cp})T_{extra}(p_i))\|^2 \quad (17)$$

where $\|f\|^2=f^T f$ such that $J_{cost}$ becomes a scalar number, $q_i$ and $p_i$ are the values of the joint angles and extra parameters for measurement i, and N denotes the total number of measurements. The kinematic parameters are now found as the parameters solving the following optimization problem:

$$\min_{\text{over } x_{kin}, x_{cp}} J_{cost} \qquad (18)$$

In the case of a known clamping point, the parameters $x_{cp}$ are known and are not part of the optimization variables. The optimization problem is nonlinear in the parameters and it can be solved with methods for nonlinear optimization. Since manipulator parameters are approximately known, local optima is less of a problem in this optimization. In case of a local optima, typically detected by some parameter identified out of its uncertainty range, both experiments and identification can be iterated, for instance with a fixed wrist orientation first, and then with wrist rotations included when the main axes goemertry is identified.

Multiple configurations and load conditions will be needed to be able to perform the identification of all unknown parameters. Each experiment gives one relation (14). All experiments can be handled in the same system of equations according to $$\begin{bmatrix} {}^1K & 0 \\ {}^1P & N \\ {}^1J_u & {}^1J \\ \vdots & \vdots \\ {}^nK & 0 \\ {}^nP & N \\ {}^nJ_u & {}^nJ \end{bmatrix} \begin{bmatrix} {}^1u \\ {}^1q \\ \vdots \\ {}^nu \\ {}^nq \end{bmatrix} = \begin{bmatrix} {}^1F \\ {}^1\theta_q \\ {}^1J\ {}^1q_z \\ \vdots \\ {}^nF \\ {}^n\theta_q \\ {}^nJ\ {}^nq_z \end{bmatrix} \qquad (19)$$

where the left superscripts denote the experiment index, and n denotes the total number of experiments, i.e. corresponding to the total number of unique poses.

Unknown parameters can be identified according to the method described in WO2015030650. The function S, Eq. (12) in WO2015030650, is now defined as the left hand side of Eq. (14), and the vector F as the right hand side of Eq. (14). With these definitions, the same method as described in Eqs. (13)-(16) in WO2015030650 may be used for identification.

In the 1D case, the one depicted in FIG. 9a, it is not possible to identify all parameters based on measuring the motor torque and motor angle only. This is due to the fact that there are three stiffness elements connected in series, and to identify them at least one extra measurement is needed. In the 2D and 3D cases, however, it is possible to change the clamping configuration and thus the configuration of the manipulator 2. This will result in that the stiffness elements will be excited differently and the stiffness parameters will thus be possible to identify if sufficiently many clamping configurations are used.

For a 6 DOF manipulator 2, such as the one in FIG. 1, the number of deformation parameters $n_u$ is 72, and the total number of unknowns for n experiments is $n_\alpha n_k + 66 \cdot n$, including the unknown joint angles q (only motor angles $\theta_q$ are measured). The number of elastic degrees of freedom, $n_\alpha$, for a 6 DOF manipulator is usually 49, and if the stiffness parameters are assumed to be linear, such that $n_{k\ is}$ 1, the total number of unknown parameters will be 49+66·n. Each clamping experiment gives 84 equations, and as the number of equations must be larger than the number of unknowns to be solvable, at least n=3 experiments will be needed. There will, however, be disturbances and modeling errors present and some more experiments will be needed. In a normal case with n=10, the extended stiffness matrix in Eq. (19) will have 840 rows and 78 columns.

An example of a clamping experiment performed with the industrial robot 1 (FIG. 1) is illustrated in FIG. 10. Each joint of the manipulator 2 was controlled to slowly move between two positions. Before any measured data from an experiment like this one can be used for the stiffness identification, the non-linear effects have to be taken care of. This includes friction, which can be removed by taking the average of the motor torque for motion in positive and negative joint direction. An example of this can be seen as the dashed lines in FIG. 10. That is, the average of the asymptotic parts in the vertical torque direction forms a dashed line for each direction of each axis. There is also a lost motion when the motor torque switches sign, which can be seen as the friction compensated motor torque (the dashed lines) for positive and negative motor torques, do not intersect at zero motor torque. The dashed line at zero torque thereby defines the backlash for each respective joint. This effect can be compensated for by shifting the motor angle, equally much but with different sign for positive and negative motor torques (this shifting operation is not displayed in FIG. 10). If the relation between the motor torque and motor angle behaves linearly, only one term with basis function 1 in (10) is needed, i.e., linear stiffness parameters. But if a nonlinear behavior can be identified, a nonlinear expansion as described in (10) will be needed. The friction compensated motor torque and the shifted motor angle, denoted $\theta_{q\ in}$ (14), are to be used for the stiffness identification.

Thus, according to one embodiment, the method includes to automatically determining the distribution of compliance over links and joints of the manipulator 2. According to one embodiment, the method includes determining non-linear stiffness by identifying parameters of a mathematical expansion of the non-linear function in a same optimization as providing the distribution of the compliance.

With the non-geometric parameters determined, at least with intial values based on the nominal geometry of the manipulator 2, determining the kinematic parameters can be carried out as another part of step A5. As has been previously described, the robot 1 includes a kinematic model with a set of kinematic parameters, and hence motions for performing the geometric calibration can be programmed directly as part of the method.

From the monitored quantities, well-conditioned segments are selected, avoiding known uncertainties. The data of the monitored quantites may be reduced. Further, the influence of motor friction of the motors may be removed. The data of the monitored quantities are then transformed to the link side of the manipulator 2. For identifying the set of kinematic parameters, first joint models, link models and corresponding joint quantites such as joint position and motor torques should be provided. They may be readily available from previous calibrations.

When the manipulator 2 is connected to the double-ball-bar 4, the motion of the manipulator 2 will be mechanically constrained, as illustrated in FIGS. 1 and 2, along a sphere. This sphere will have its center where the double-ball-bar 4 is fastened to the environment (to be more precise, in the center of the Gimbal joint 19), and the radius of the sphere is given of the length of the double-ball-bar 4 (from the center of the Gimbal joint 17 to the center of the Cardan joint 19). If the end-effector of the manipulator 2 is defined as the center of the Cardan joint 17, then the following relation can be established:

$$(x_{ee}-x)^2+(y_{ee}-y)^2+(z_{ee}-z)^2+l^2=0 \quad (20)$$

where (x, y, z) is the center of the Gimbal joint 19 and l is the length of the double-ball-bar. This relation can be used to calibrate the values of the kinematic parameters, $x_{kin}$, by moving the manipulator 2 to multiple positions on the sphere and find the parameters, $x_{kin}$, that are consistent with the relation (20). This can be performed by defining the cost function $$f_{cost}(x_{kin}, x, y, z, l) = \sum_{i=1}^{m} ((x_{ee}(^i q, x_{kin}) - x)^2 + (y_{ee}(^i q, x_{kin}) - y)^2 + (z_{ee}(^i q, x_{kin}) - z)^2 - l^2)^2 \quad (21)$$

where $\{^i q\}_{i=1 \ldots m}$ are measured joint positions, in total m sampled positions, from an experiment where the manipulator 2 has performed spherical motions while connected to the double-ball-bar 4. The center position of the Gimbal joint 19 as well as the length of the double-ball-bar 4 are also unknown parameters that may need to be identified, if not previously identified.

The cost function only takes the Cartesian position of the end-effector into account, as the orientation of the end-effector is unconstrained. It is, however, possible to measure the orientation of the end-effector by embedding sensors in the double-ball-bar 4. This information can then be added as extra terms in the cost function (21).

Since the parameters in (21) are not exactly known when the manipulator 2 moves with the Cardanic centerpoint on the sphere, the manipulator 2 will be forced to stay on the sphere and will because of this it can be subject to large forces. Alternatively, when any of the multiple fix-point embodiments depicted in FIGS. 3-6 is used, the clamping may result in significant forces. These forces will deform the manipulator 2 and this will decrease the accuracy of the geometric calibration if this effect is not taken care of. The stiffness identification will result in a global stiffness matrix for the manipulator 2, K in (3), and the motor torques will make it possible to calculate F, the right hand side of (3). The deformations, u, can be calculated from (3) with the boundary condition that the base link 10 of the manipulator 2 has not deformed, i.e., the first six elements of u have to be zero in the 3D case. With u known, the compliant forward kinematics $f_{compliant}$ should be used, i.e., the forward kinematics function that also takes the deformations of the robot into account.

$$f_{compliant}(q, x_{kin}, u) = \begin{bmatrix} R_u & p_u \\ 0_{1\times 3} & 1 \end{bmatrix} \quad (22)$$

The subscript u for R and p indicates that the deformations have been taken into account. The Cartesian position of the end-effector is now given by $$p_u = \begin{bmatrix} x_{ee,u} \\ y_{ee,u} \\ z_{ee,u} \end{bmatrix} \quad (23)$$

The deformed position of the end-effector should now be used in the cost function (21), i.e., replace $x_{ee}$ with $x_{ee,u}$, $y_{ee}$ with $y_{ee,u}$, and $z_{ee}$ with $z_{ee,u}$.

The values of the unknown parameters in the cost function (21) can be found by the means of minimization. Standard techniques can be used to perform the actual optimization, such as the Newton or the Gauss-Newton method.

There exist a scaling uncertainty when minimizing the cost function (21). All length parameters can be scaled with the same parameter and still fulfill the relation (20). To fix the solution a distance need to be assumed to be known. One way to do this is to measure the length of the double-ball-bar 4. Another possibility is to measure a relative distance between two different positions on the sphere and use this to fix the scaling.

The stiffness identification procedure relies on the kinematic parameters of the manipulator 2 to fix the scaling of the deformations and the stiffness parameters. When the kinematic parameters are updated in the kinematic calibration step, the stiffness parameters might need to be re-identified, i.e., the idenitification process needs to be re-run, but no new experiments will be needed. The change in kinematic parameters will in all practical cases be small, as there will be nominal parameters available. The effect on the equations for the stiffness identification will therefore be very small (small changes of the kinematic parameters will lead to very small changes of the Jacobians), and the change in stiffness parameters will also be very small. And once the stiffness model parameters have been updated, there might be a need to re-identify the kinematic parameters. In each iteration the changes in the parameters will become smaller and smaller, and it converges in a few iterations.

To exemplify the identification of the kinematic parameters, an ideal simulation of the robot in FIG. 1 was performed. The motion of the robot on the spherical surface was logged with a high sampling rate, but initially, to speed up the identification process, only very few of the samples were used for identification. The identified parameters were then inserted into the cost function (21) and evaluated for all logged samples. The value of the cost function was very low for those samples used for identification, but large for parts of the samples not used for identification. The samples with the largest cost function values were added to the identification samples, and the identification was redone. This procedure was iterated until the cost function was low for all logged samples. Initially ten samples were used for identification, and ten new samples were added in each iteration. The identified parameters were satisfactory when 50 samples were used for identification, out of a total of 1000 logged samples. A low cost function means small residuals as of the optimization problem. According to some embodiment, the method comprises iterating steps A2 to A4, with the set of target poses in A2 being the same or being changed for each iteration, until load on the at least two axes is adjusted such that it results in a residual of the identification that is lower than a predetermined level corresponding to a certain robot accuracy.

The method further includes in a step A5 to determine the at least one geometric property of the compliant manipulator based on the identified set of kinematic parameters of the kinematic model. This may be done by simply extracting the at least one geometric property from the identified set of kinematic parameters of the kinematic model. It may also include some calculation or estimation in order to accurately determine the at least one geometric property from the identified set of kinematic parameters of the kinematic model.

Since there exists many different mathematical representations of a manipulator, where the previously described screw representation is one, equations (1)-(5), that can be used to describe the motion of the end-effector, equations (5) and (22), a conversion of resulting minimization of (21) may be needed. One such conversion would result in conversion of a screw representation to a DH representation. The mapping between a screw representation is not a one to one mapping, but would result in parameters that could update one or more parameters of a standard DH kinematic representation.

Different brands of control system 3 and thus controller assumes different geometric properties. Due to the generic character of the present method, it is possible to select and convert the identified geometric properties such that the determined at least one geometric property may be used for updating nominal kinematic parameters of a manipulator 2. It may be used for updating nominal kinematic parameters of the same manipulator 2 as the method was performed on, or be used for updating nominal kinematic parameters of another manipulator of the same type. The determined at least one geometric property may be used for updating a robot program or motion control parameters of the manipulator 2.

The following illustrates the proposed method for an ideal case in terms of a simulated industrial robot. In this case an ABB IRB140, which is simpler than the robot in FIG. 1 since there is no parallel link 22. The nominal twist parameters are given in Table 1:

TABLE 1

The nominal twist parameters for the ABB IRB140 model used in the simulations.

| Joint | Twist | | | | | |
|---|---|---|---|---|---|---|
| 1 | 0 | 0 | 0 | 0 | 0 | 1 |
| 2 | −0.352 | 0 | 0.07 | 0 | 1 | 0 |

TABLE 1-continued

The nominal twist parameters for the ABB IRB140 model used in the simulations.

| Joint | Twist | | | | | |
|---|---|---|---|---|---|---|
| 3 | −0.712 | 0 | 0.07 | 0 | 1 | 0 |
| 4 | 0 | 0.712 | 0 | 1 | 0 | 0 |
| 5 | −0.712 | 0 | 0.45 | 0 | 1 | 0 |
| 6 | 0 | 0.712 | 0 | 1 | 0 | 0 |

The length unit is [m].

g0 is given as:

$$g0 = \begin{bmatrix} 0 & 0 & 0 & 0.515 \\ 0 & 1 & 0 & 0 \\ -1 & 0 & 0 & 0.712 \\ 0 & 0 & 0 & 1 \end{bmatrix} \quad (24)$$

The actual twist parameters used in the simulations are given in Table 2 (below). The case with an unknown clamping point is considered in the simulations, and it is therefore not possible to identify the parameters for the first joint, and they are therefore assumed to be known. It is further assumed that g0 and the motor offsets are known.

In the simulations, a first angular offset item was attached to the robot end flange, and a first tool exchanger is attached to the angular offset item. This assembly corresponds to the tool exchanger assembly 41 illustrated in FIGS. 3-6. The combined transformation matrix for the first angular offset item and first the tool exchanger was:

$$T_{offset1} = \begin{bmatrix} 0.86603 & 0 & 0.5 & -0.005 \\ 0 & 1 & 0 & 1 \\ -0.5 & 0 & 0.86603 & 0.06 \\ 0 & 0 & 0 & 1 \end{bmatrix} \quad (25)$$

TABLE 2

The actual twist parameters for the ABB IRB140 model used in the simulations. The length unit is [m].

| Joint | Twist | | | | | |
|---|---|---|---|---|---|---|
| 1 | 0 | 0 | 0 | 0 | 0 | 1 |
| 2 | −0.35198 | −0.00070 | 0.07000 | 0 | 0.99995 | 0.01000 |
| 3 | −0.712 | 0 | 0.071 | 0 | 1 | 0 |
| 4 | 0 | 0.72126 | 0 | 0.99995 | 0 | 0.01000 |
| 5 | −0.70847 | 0.07085 | 0.47767 | 0.09950 | 0.99504 | 0 |
| 6 | 0 | 0.712 | −0.01 | 1 | 0 | 0 |

After the first tool exchanger, a second angular offset item with a tool changer was added with transformation matrix:

$$T_{offset2} = \begin{bmatrix} 1 & 0 & 0 & 0.2 \\ 0 & 1 & 0 & 0 \\ 0 & 0 & 0 & 0.1 \\ 0 & 0 & 0 & 1 \end{bmatrix} \quad (26A)$$

The tool changer on the second angular offset item was attached to a clamping point defined by a tool connector which was rigidly attached in the work-space of the robot. The tool changer and the tool connector forms a second tool exchanger. The clamping point had the following transformation in the base coordinate frame of the robot:

$$T_{cp} = \begin{bmatrix} -1 & 0 & 0 & 0.5 \\ 0 & 1 & 0 & 0 \\ 0 & 0 & -1 & 0.45 \\ 0 & 0 & 0 & 1 \end{bmatrix} \quad (26B)$$

Each of the first and second tool exchangers were assumed to be possible to lock in eight different configurations, each configuration separated by a 45 degree rotation around the z-axis of respective tool exchanger. With the two tool exchangers, this resulted in total 64 different fix clamping points for the robot flange. The robot could, however, not reach all of the 64 positions with its given joint limits, and 22 of the points had to be discarded.

The first simulation was performed in ideal conditions, i.e., noise-free measurements. The resulting parameter estimation errors were:

$$\|\hat{x}_{twist} - x_{twist}\| = 3.2713 \cdot 10^{-7}, \|\hat{T}_{cp} - T_{cp}\| = 3.8032 \cdot 10^{-7} \quad (27A)$$

where the twist parameter estimation error norm is the Euclidian 2-norm, and the clamping point transformation matrix estimation error norm is the Frobenius norm. The initial estimate for the twist parameters were the nominal values from the Table 1, which gives an initial estimation error of 0.1239. The mean position error (RMS) of the flange of the robot with the identified parameters becomes 0.00001 mm.

In the second simulation, measurement noise was added to the measured joint angles. The noise was normal distributed and it had a standard deviation of 0.5° on the motor side (before the gearbox). The resulting parameter errors in this simulation were:

$$\|\hat{x}_{twist} - x_{twist}\| = 1.438 \cdot 10^{-3}, \|\hat{T}_{cp} - T_{cp}\| = 4.6454 \cdot 10^{-4} \quad (27B)$$

The noise degrades the estimation performance significantly. The resulting mean position error of the robot flange becomes 0.07 mm.

Physical Example

Motor offsets, i.e., the definition of zero joint angle in terms of measured motor angle, is a particularly important subset of geometric parameters. Apart from being part of the complete geometric calibration, determining motor offsets is a most common service scenario within industrial robot usage, whenever a robot joint motor or transmission needs to be replaced. Corresponding to this need, an example experiment was performed using an ABB IRB2400 robot, as the one depicted in FIGS. 1-6. While this example is overly simple by neglecting the full kinematics and thereby omitting the identification based on optimization using Eq. 21 and 22, it is formulated for clarity. The objective is to achieve high repeatability of the new motor offset with respect to the previous motor position, such that the robot can resume its tasks after service without the need for adjustment of programmed poses.

In general terms, using a constraining device 4 as in FIGS. 1-2 supports determination of the complete set of geometric parameters such that full accuracy is achieved over the complete working range, whereas the constraining device 4 as in FIGS. 3-6 can provide parameters for accuracy in the part of the work-space where the constraining device 4 is located. In the latter case, both non-geometric parameters such as stiffness and geometric parameters such as motor offsets can be identified in the same set of clamped poses. A further simplification for the service case is to have a constraining device comprising only one docking point (e.g. the clamping point defined by the constraining item 43), or equivalently having two mating parts 46a and 46b at a fixed location in the work-space and on the manipulator 2 respectively. That is the setup in this example, including the angular offset item 45.

Equivalently, in case the manipulator would not have been equipped with a tool-exchanger as part of the application, the mating parts 46a and 46b can be swapped (i.e. exchange places) if that is more practical for end-effector weight and for air supply to the looking mechanism (inside 46a, not shown). With such an additional clamping device, the angular offset item 45 is typically not needed since the clamping point will have some useful offset from the end flange 44 of the manipulator 2.

By clamping at the described fixed location in work-space before any repair is needed, a reference pose is defined for the robot locally (without need for knowing the location in absolute external references). By repeating the clamping experiments in the same position with the new motor installed, the motor offset identification is performed with all offsets locked at their previous values except for the offset of the replaced motor. This procedure was performed several times to test the repeatability.

Specifically, the robot was clamped (A1) using the tool changer 46a in four different poses as permitted mechanically by the clamping mechanism. Additionally, by turning the fourth joint 14 by 180 degrees and turning joint five 15 and joint six 16 such that the same target pose is reached, another four configurations are permitted, thus creating in total eight different configurations. In principle it would be sufficient to use only one of these eight configurations, which is also the case when using some exchanger that only permits one orientation, but by using all eight configurations potential errors can be decreased by averaging.

Another benefit of having multiple clamping points via multiple orientations within the exchanger 46, is that the disclosed method works well even if some clamped poses would turn out to be unsuitable for the identification. Here, in this example setup, two of the eight clamped configurations turned out to be unsuitable due to proximity to a singular configuration. While the disclosed method in principle works also near or in a singular configuration, at least for an ideal robot, the identification is better conditioned with the friction-aware control not being effected by additional friction and compliance effects from strange load cases that do not occur within the application. To obtain a smooth motion with full resolution of motor angle, the joint servos were configured to be compliant, but that implies overly large deviations near singularities (due to joints almost aligning exhibits large torques). Selection of the useful (in this case six) poses can be automated based on nominal kinematics and those deviations being monitiored from the motor signals, but here it was simply observed on the turning of the involved axes that the two configurations were close to some singularity, and hence those poses were manually excluded.

The identification was carried out by commanding the manipulator to approach each of the selected six target poses (A2), and then performing friction-aware control with the mentioned servo compliance activated while accomplishing a reciprocal motion followed by control to zero velocity around zero torque at the mid-point of the joint (A3). The obtained monitored motor positions, reflecting the elastic behavior of the joints (mechanically and by the compliant control) were then used to identify the motor offsets according to a scaling and representation that is suitable also for the complete kinematic identification (A4). Then, the obtained motor offsets as defined by this particular controller 3 were determined (A5) and entered into the system. Thereafter, the motions according to the user program performs practically the same as before the change.

By having a fixed clamping point in the workspace of the robot, the disclosed method also works for the placement of the robot, replacement of Link 0 (the robot foot, typically including joint 1 mechanics), and the identification of motor offset for joint 1. With earlier methods, these geometric properties are problematic to determine and to keep separate. Here, with the clamping point assumed to be in the same position for all experiments, the repeatability of motor offsets re-identification in terms of an mean absolute error (MAE) for each joint, averaged over 8 different sets of experiments, is shown in the following table where the unit is degrees on motor side:

| Joint | J1 | J2 | J3 | J4 | J5 | J6 |
|---|---|---|---|---|---|---|
| MAE | 0.05 | 0.19 | 0.07 | 0.02 | 0.08 | 0.08 |

Except for joint 2 each one of these errors correspond to a maximum Cartesian error less than 0.04 mm at the robot flange for this type of robot, which is 10 times better than normally required (as a practice due to the limitation of earlier methods). All the clamped configurations are not quite optimal for the second axis (12 in FIG. 1, J2 in the above table), which loads the fixed item 43 in its most flexible direction with a motion that also involves the parallel bar 22 of axis three. A more optimal configuration for joint 2 could be mechanically provided, but the result is more than sufficient; we consider the other joints as representative for the method. Given the properties of the controller 3, there is a theoretical limit on the possible accuracy, for instance due to the resolution of the motor angle sensor. In this example joint four (J4 in the table) reached the theoretically possible limit, and the other joints are quite close to that limit.

Using former methods, an acceptable accuracy can be obtained by instrumenting each robot joint for torque- or position-based detection of motor offset, but at the cost of that instrumentation, which is not needed with the disclosed method. Furthermore, in most robot systems the remaining errors are much bigger and depending on the skills of the service engineer. More importantly, if more than one motor is replaced or some other machine element is replaced, the joint errors (as of the above table) would be additive. With the disclosed method, errors do not sum up, and thus the best possible accuracy at the end-effector is accomplished.

The invention claimed is:

1. Method for determining at least one geometric property of a manipulator that influences end-effector motions of the manipulator, wherein the manipulator is arranged to be controlled by a control system for moving an end-effector of the manipulator to target poses, and wherein the manipulator comprises at least two axes, of which at least one axis comprises at least one elasticity and is affected by friction effects, the method comprising:
   constraining motion of the manipulator, such that the motion of the manipulator is physically constrained in at least one degree of freedom, thereby enabling a constrained manipulator motion and correspondingly a constrained motor motion for the at least one axis;
   commanding the manipulator to approach a set of target poses, where, for each target pose, a physical pose is reached in which the constrained manipulator motion can be performed, which includes a non-zero constrained motor motion;
   performing friction-aware control of the constrained manipulator motion for a period of time, to accomplish well-defined friction forces/torques that can be separated from the friction effects, while monitoring quantities related to motor torque and to motor angle of the at least one axis;
   performing an identification of a set of kinematic parameters for an elasto-kinematic model that includes at least one known quantity representing the at least one elasticity, the identification being based on the monitored quantities and on elastic properties of the manipulator, where the friction effects are excluded from the identification; and
   obtaining the at least one geometric property of the manipulator based on the identified set of kinematic parameters.

2. The method according to claim 1, wherein the constraining motion of the manipulator comprises connecting a link of the manipulator to a constraining device.

3. The method according to claim 1, wherein the set of target poses comprises a plurality of different orientations and positions of the end-effector.

4. The method according to claim 1, further comprising performing friction-aware control by controlling the at least one axis in a reciprocal motion encompassing backlash of the at least one axis.

5. The method according to claim 1, further comprising:
   commanding the manipulator to approach the set of target poses, where, for each target pose, a physical pose is reached in which the constrained manipulator motion can be performed, due to the existence of at least one unconstrained direction of the constrained manipulator motion; and
   performing friction-aware control by controlling the at least one axis such that fully developed friction is accomplished.

6. The method according to claim 1, further comprising:
   commanding the manipulator to approach the set of target poses, where, for each target pose, a physical pose is reached, in which the constrained manipulator motion can be performed due to the at least one elasticity effecting the at least one axis; and
   performing friction-aware control by controlling the at least one axis in a reciprocal motion encompassing a mid-point corresponding to a middle of any backlash while disregarding the friction effects.

7. The method according to claim 1, further comprising:
   commanding the manipulator to approach the set of target poses, where, for each target pose, a physical pose is reached, in which the constrained manipulator motion can be performed due to the at least one elasticity effecting the at least one axis; and performing friction-aware control by controlling the at least one axis in a reciprocal motion encompassing a gravity-load-point and such that the at least one axis reaches the gravity-load-point.

8. The method according to claim 1, wherein at least one of the steps of the method is performed automatically by the control system.

9. The method according to claim 1, wherein manipulator motion refers to motion of an end-effector mounted via a tool-exchanger onto an end-flange of the manipulator, wherein end-effector properties are previously known, and wherein constraining motion of the manipulator comprises docking the manipulator to a constraining device that provides a mechanical interface with the tool exchanger.

10. The method according to claim 1, wherein the at least one geometric property is related to a peripheral device of the manipulator, the peripheral device comprising at least one link that is influenced by the manipulator motion.

11. The method according to claim 2, wherein the constraining device has known elastic properties.

12. The method according to claim 1, wherein constraining motion of the manipulator comprises clamping the manipulator to at least one clamping point, where at least one of the position and the orientation of the at least one clamping point is unknown.

13. The method according to claim 1, wherein constraining motion of the manipulator comprises offsetting a tool exchanger arranged to the manipulator such that a rotation axis of the tool exchanger is non-parallel with a rotation axis of a link of the manipulator that the tool exchanger is attached to.

14. The method according to claim 1, further comprising iterating the commanding step and the performing step, until loads on the at least two axes are adjusted to result in a residual of the identification that is lower than a predetermined level corresponding to a certain robot accuracy.

15. Use of the at least one geometric property determined according to the method of claim 1 for updating nominal kinematic parameters of a manipulator.

16. Use of the at least one geometric property determined according to the method of claim 1 for updating a robot program.

17. Use of the at least one geometric property determined according to the method of claim 1 for updating motion control parameters of the manipulator.

18. A system for determining at least one geometric property of a manipulator that influences motions of the manipulator, the system comprising a control system, wherein the manipulator is arranged to be controlled by the control system for moving an end-effector of the manipulator to target poses, and wherein the manipulator comprises at least two axes, of which at least one axis comprises at least one elasticity and is affected by friction effects, characterized in that the manipulator is constrained by a constraining device such that the motion of the manipulator is physically constrained in at least one degree of freedom, thereby to enable a constrained manipulator motion and correspondingly a constrained motor motion for the at least one axis, wherein the control system is operable to:

command the manipulator to approach a set of target poses, where, for each target pose, a physical pose is reached in which the constrained manipulator motion can be performed, which includes a non-zero constrained motor motion;

perform friction-aware control of the constrained manipulator motion for a period of time, to accomplish well-defined friction forces/torques that can be separated from the friction effects, while monitoring quantities related to motor torque and to motor angle of the at least one axis;

perform an identification of a set of kinematic parameters for an elasto-kinematic model that includes at least one known quantity representing the at least one elasticity, the identification being based on the monitored quantities and on elastic properties of the manipulator, where the friction effects are excluded from the identification; and obtain the at least one geometric property of the manipulator based on the identified set of kinematic parameters.

19. The system according to claim 18, further comprising a constraining device having at least one clamping point to be used for constraining motion of the manipulator by clamping the manipulator to the at least one clamping point.

20. The system according to claim 18, wherein the constraining device provides a mechanical interface with a tool exchanger with one clamping point.

21. The system according to claim 20, wherein the tool exchanger supports a plurality of docked orientations.

22. The system according to claim 20, wherein the constraining device comprises an offset item arranged to offset the tool exchanger, such that a rotation axis of the tool exchanger is non-parallel with a rotation axis of a link that the tool exchanger is attached to.

23. The system according to claim 20, wherein the respective position and orientation of the at least one clamping point are unknown.

24. A constraining device for constraining motion of a manipulator in a system for determining at least one geometric property of a manipulator that influences motions of the manipulator, the system comprising a control system, wherein the manipulator is arranged to be controlled by the control system for moving an end-effector of the manipulator to target poses, and wherein the manipulator comprises at least two axes, of which at least one axis comprises at least one elasticity and is affected by friction effects, wherein the constraining device comprises a plurality of clamping points, and wherein the constraining device is configured to be automatically attached between the manipulator and a fixed point in a workspace of the manipulator.

25. The constraining device according to claim 24, wherein the constraining device provides a mechanical interface with a first tool exchanger defining a first clamping point, for attachment to the manipulator by clamping.

26. The constraining device according to claim 25, further comprising a tool connector of the first tool exchanger.

27. The constraining device according to claim 25, further comprising a tool changer of the first tool exchanger.

28. The constraining device according to claim 24, wherein the constraining device provides a mechanical interface with a second tool exchanger defining a clamping point, for attachment to the fixed point in the workspace of the manipulator.

29. The constraining device according to claim 28, further comprising a tool connector of the second tool exchanger.

30. The constraining device according to claim 28, further comprising a tool changer of the first tool exchanger.

31. The constraining device according to claim 24, wherein the constraining device is configured to be automatically attached to the fixed point by clamping.

32. The constraining device according to claim 24, further comprising a locking mechanism configured for locking the constraining device to the manipulator and to the fixed point.

33. The constraining device according to claim 24, further comprising a constraining item with at least one clamping point.

34. The constraining device according to claim 24, further comprising an angular offset item with two opposite non-parallel attachment sides.

35. The constraining device according to claim 24, further comprising an elongated offset item with two elongated attachment sides.

* * * * *